US009703936B2

(12) United States Patent
Ochmanek et al.

(10) Patent No.: US 9,703,936 B2
(45) Date of Patent: Jul. 11, 2017

(54) DATABASE SYSTEM FOR DYNAMIC RETRIEVAL OF NESTED DATA ITEMS OVER A NETWORK

(71) Applicant: LVRT, LLC, Malibu, CA (US)

(72) Inventors: Matthew Ochmanek, Malibu, CA (US); Dilip Krishnamoorthi, San Diego, CA (US); Vineet Sriram, Cupertino, CA (US)

(73) Assignee: LVRT, LLC, Malibu, CA (US)

( * ) Notice: Subject to any disclaimer, the term of this patent is extended or adjusted under 35 U.S.C. 154(b) by 0 days.

(21) Appl. No.: 15/294,582

(22) Filed: Oct. 14, 2016

(65) Prior Publication Data

US 2017/0109504 A1 Apr. 20, 2017

Related U.S. Application Data

(60) Provisional application No. 62/242,003, filed on Oct. 15, 2015.

(51) Int. Cl.
| | |
|---|---|
| *G06F 21/00* | (2013.01) |
| *G06F 21/10* | (2013.01) |
| *H04L 29/08* | (2006.01) |
| *H04L 29/06* | (2006.01) |

(Continued)

(52) U.S. Cl.
CPC ........ *G06F 21/10* (2013.01); *G06F 17/30283* (2013.01); *G06F 17/30312* (2013.01); *G06F 17/30917* (2013.01); *G06F 21/6209* (2013.01); *H04L 67/02* (2013.01); *H04L 67/1095* (2013.01); *H04L 67/1097* (2013.01); *H04L 67/142* (2013.01); *H04L 67/42* (2013.01); *G06F 2221/0711* (2013.01); *G06F 2221/0737* (2013.01)

(58) Field of Classification Search
CPC ................. G06F 21/10; G06F 21/6209; G06F 17/30283; G06F 17/30312; G06F 17/30917; H04L 67/02; H04L 67/1095; H04L 67/1097; H04L 67/142; H04L 67/42
See application file for complete search history.

(56) References Cited

U.S. PATENT DOCUMENTS

2008/0215494 A1 9/2008 Corbett
2008/0249961 A1* 10/2008 Harkness ........... G06Q 30/0283
705/400

(Continued)

*Primary Examiner* — Noura Zoubair
(74) *Attorney, Agent, or Firm* — Knobbe Martens Olson and Bear LLP

(57) ABSTRACT

A database processing system is disclosed for accessing databases, updating nested data items and generating $n^{th}$ generation data items. The database processing system can include a server can retrieve and store data items in the databases. The server can receive a first HTTP request from a first computer over a network, the first HTTP request including a first instruction to store a digital object including a first derivative copyright content. The server can identify a first reused content in the first derivative copyright content. The server can query the databases to identify the first reused content. The server can map the first reused content with the stored identification data associated with the digital object and transmit, over a network, a message to an owner of the first reused content.

13 Claims, 24 Drawing Sheets

(51) Int. Cl.
*G06F 17/30* (2006.01)
*G06F 21/62* (2013.01)

(56) References Cited

U.S. PATENT DOCUMENTS

2008/0288411 A1* 11/2008 Copley .................. G06F 21/10
705/52
2012/0016724 A1* 1/2012 Harrison ................ G06Q 30/02
705/14.7

* cited by examiner

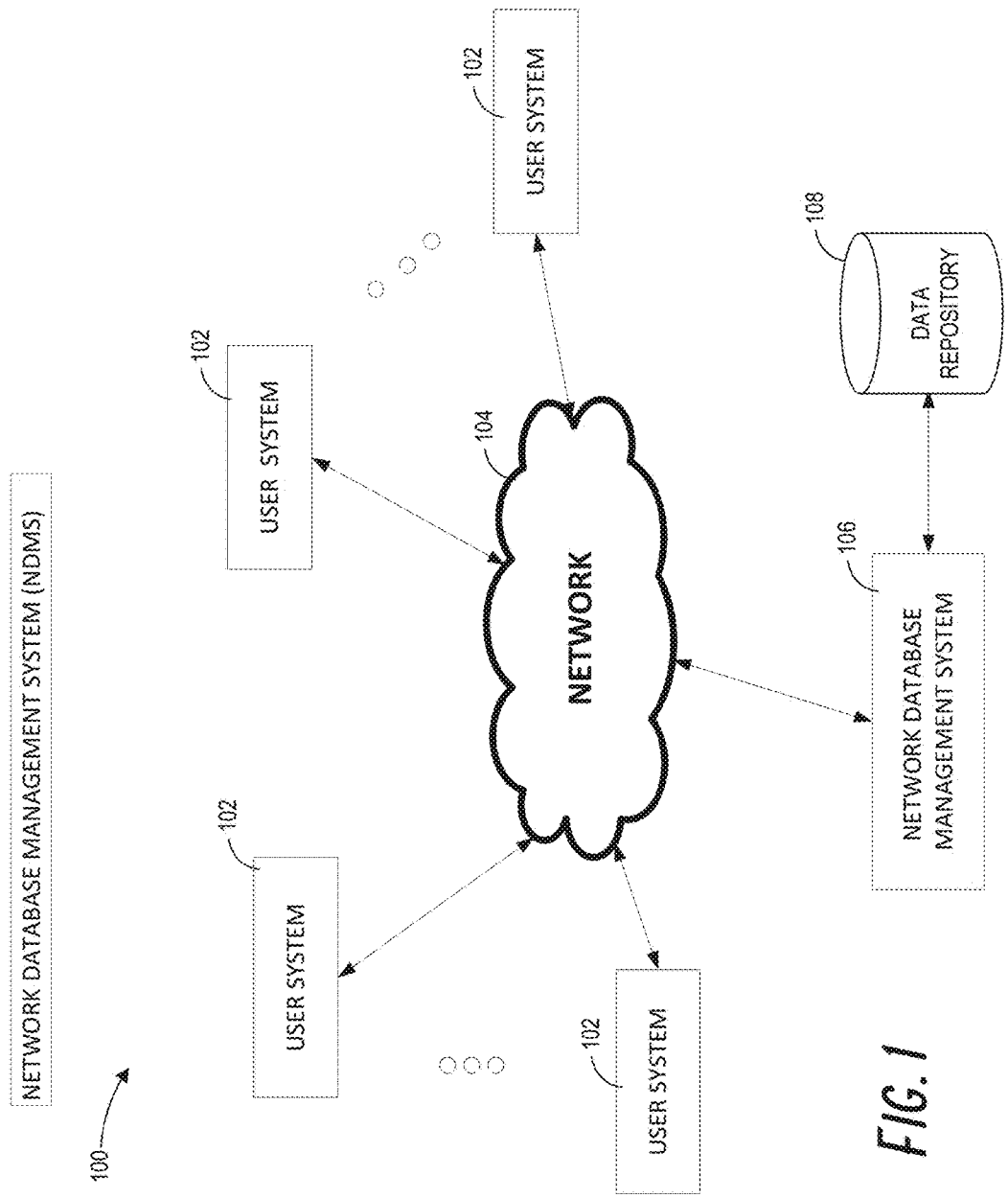

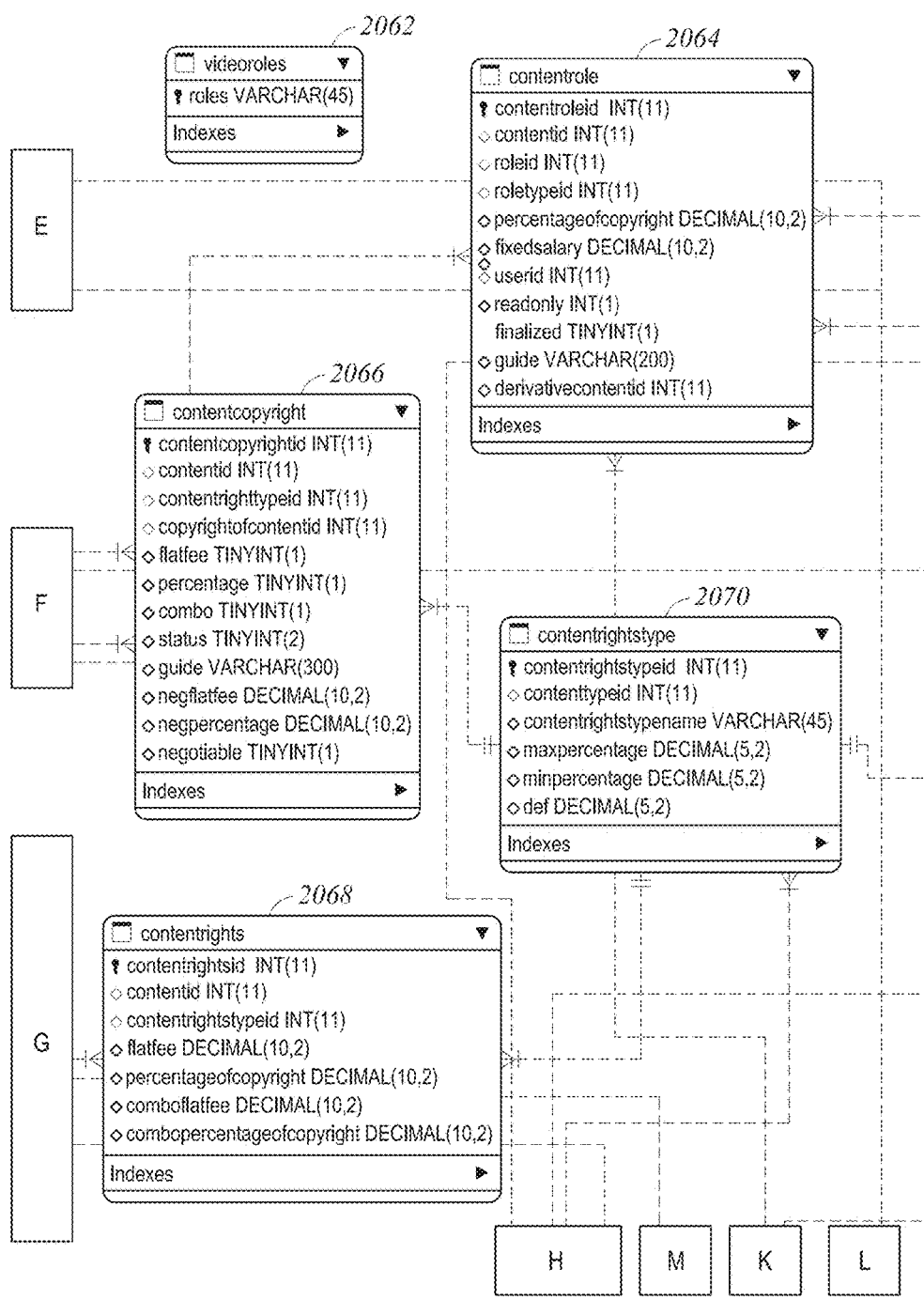

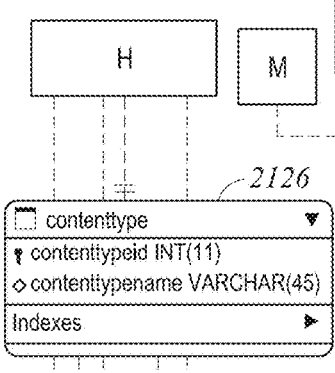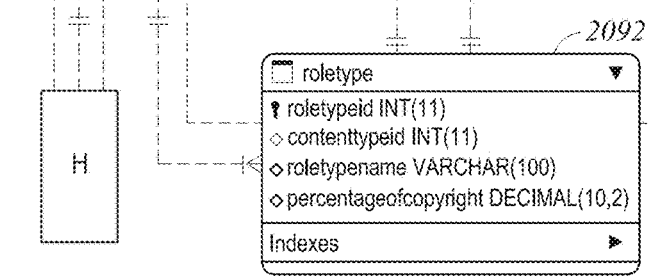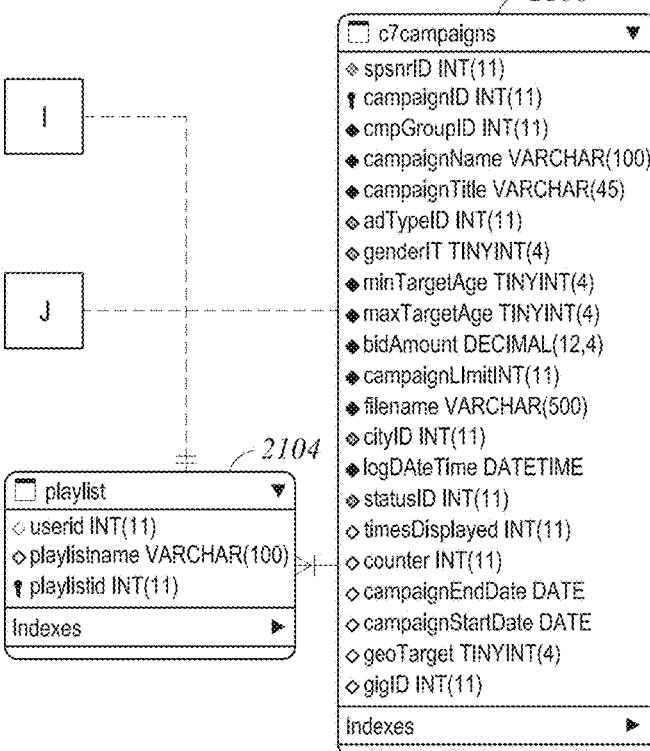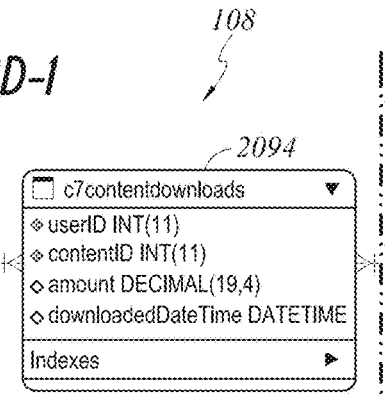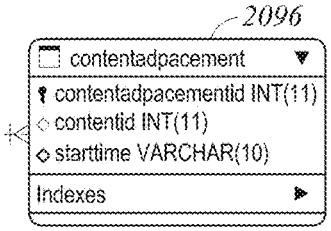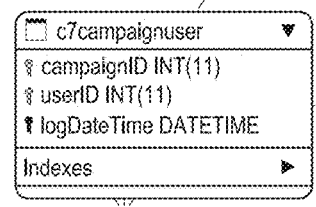

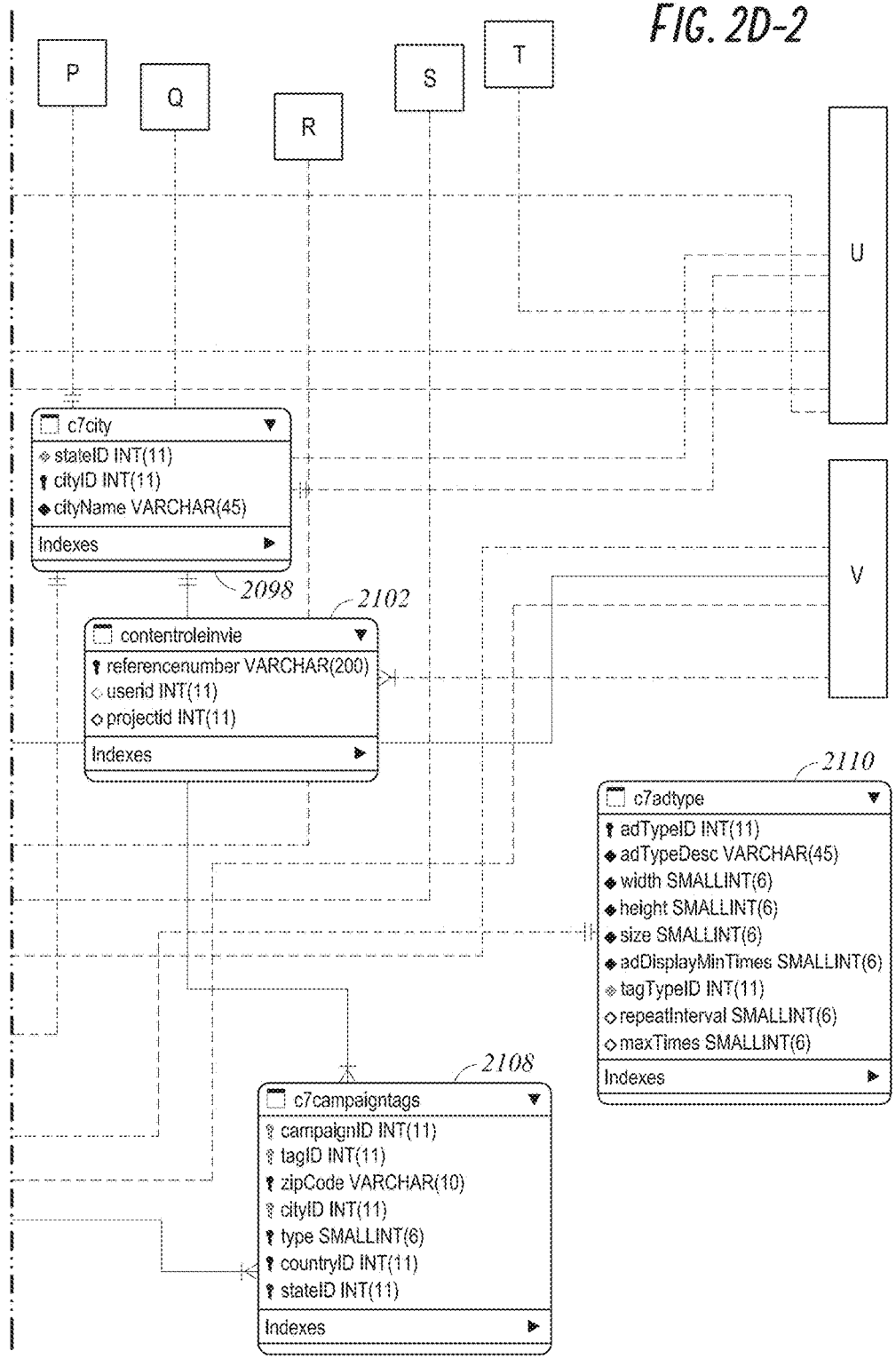

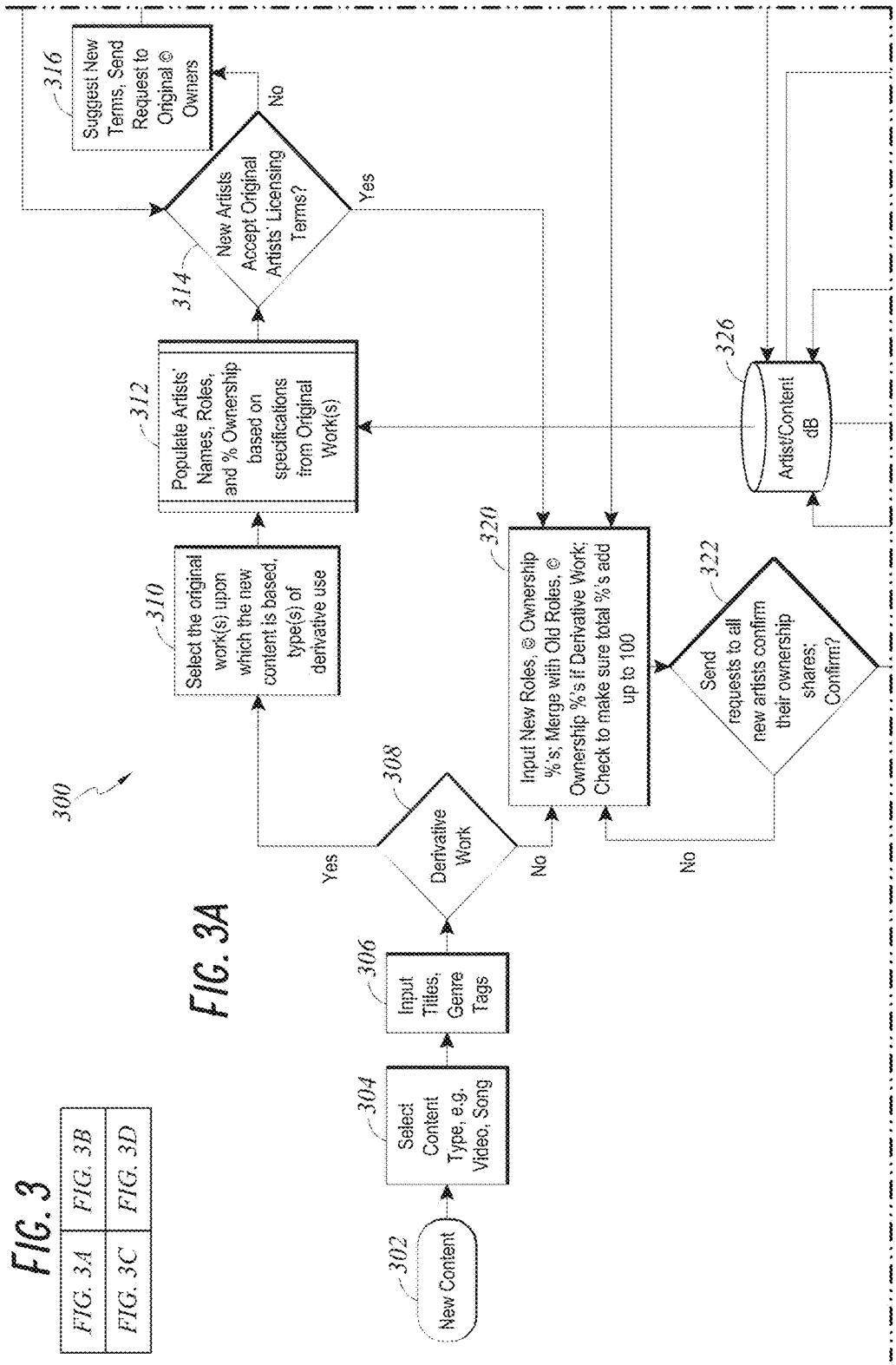

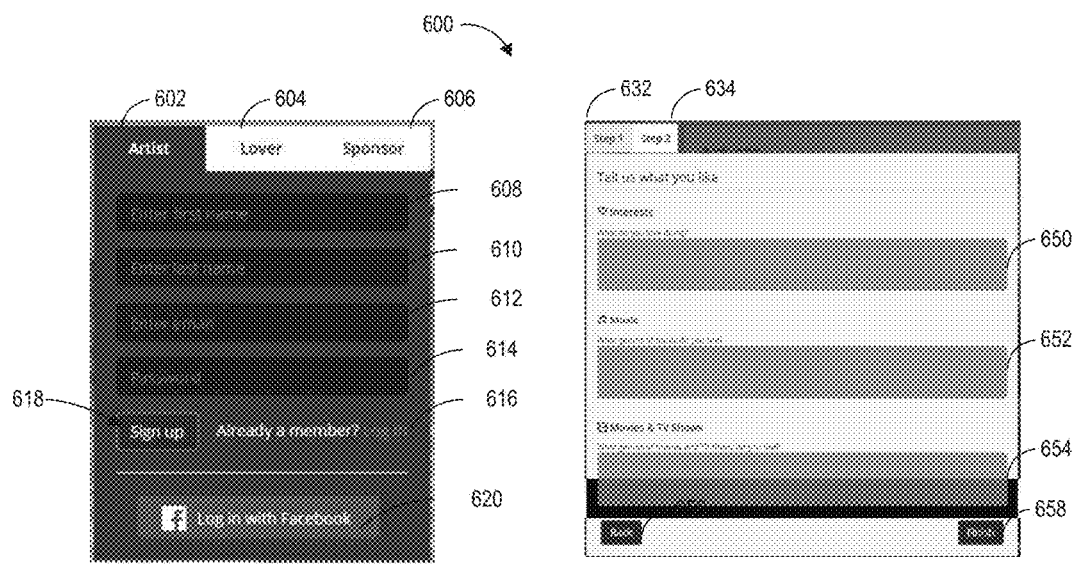
FIG. 6A
FIG. 6C
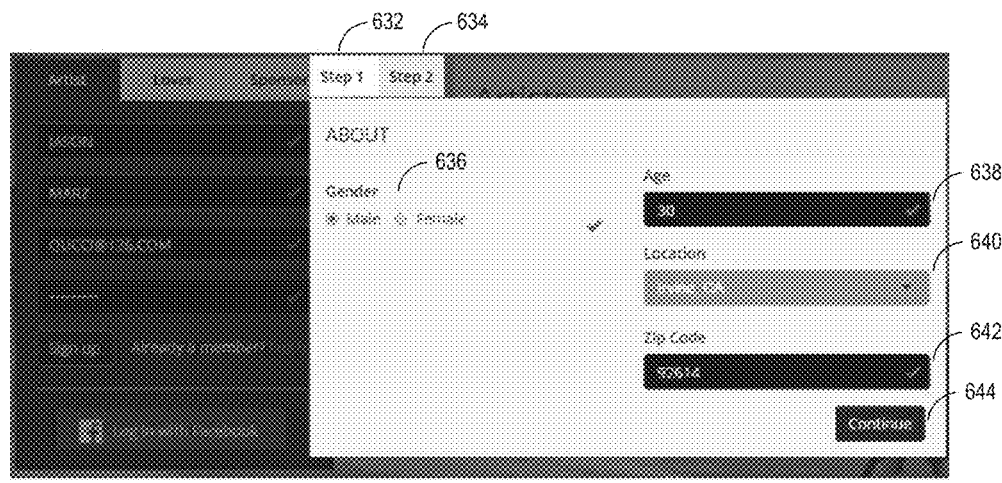
FIG. 6B

THE NDMS PROCESS N^(TH) GENERATION DERIVATIVE WORK REVENUE INTERFACE

| # | Project | Type | Created On | Budget | Spent | Ratings | | Project Revenue | Your Revenue |
|---|---|---|---|---|---|---|---|---|---|
| 1 | Dark Side Of The Moon | Album | 03/14/2015 | $10,000.00 | $0.00 | ▲ 169 | ▼ 7 | $0.10 | $0.00 |
| 2 | The Endless River | Album | 03/15/2015 | $14,000.00 | $14,000.00 | ▲ 35 | ▼ 1 | $0.02 | $0.00 |
| 3 | antaha | MusicVideo | 03/15/2015 | $2,000.00 | $4,000.00 | ▲ 43 | ▼ 0 | $3,926.86 | $1,121.96 |
| 4 | Home - A Documentary | Movie | 03/15/2015 | $1,000.00 | $0.00 | ▲ 21 | ▼ 2 | $1.75 | $0.70 |
| 5 | Comfortably Numb O2 Arena | MusicVideo | 04/30/2015 | $20,000.00 | $0.00 | ▲ 5 | ▼ 0 | $0.00 | $0.00 |

FIG. 8

THE NDMS PROCESS N^TH GENERATION DERIVATIVE WORK LICENSE TERMS INTERFACE

| | Flat fee | Percentage | Combo | |
|---|---|---|---|---|
| AudioSample | $ 1000 | % 10 | $ 500 | % 5 |
| ShortClip | $ 2000 | % 15 | $ 1000 | % 10 |
| LongClip | $ 5000 | % 20 | $ 1500 | % 15 |
| Remake | $ 90000 | % 30 | $ 45000 | % 50 |
| Sequel | $ 45000 | % 25 | $ 20000 | % 20 |

FIG. 10

DATABASE SYSTEM FOR DYNAMIC RETRIEVAL OF NESTED DATA ITEMS OVER A NETWORK

RELATED APPLICATION

This application is a non-provision of U.S. Provisional Application No. 62/242,003, filed Oct. 15, 2015, titled "System and Method for Electronic Management and Distribution of Copyrightable works," the disclosure of which is hereby incorporated by reference in its entirety.

TECHNICAL FIELD

Embodiments of the present disclosure relate to data processing, including database and file management, as well as a database system for accessing one or more databases or other data structures, and generating $n^{th}$ generation nested data items based on updates to database records.

BACKGROUND

Electronic databases provide for storage and retrieval of digital data records. Data records in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database or a database processing system (also herein referred to as "the system") for generating $n^{th}$ generation nested data items ("also herein referred to as "generation") based on updates to database records. The system may advantageously generate nested data items of certain database records. The database records can relate to copyright components. For example, the system or a user may reuse data items in a particular database record, and more specifically to a particular type of several nested data items of the particular database record. The system advantageously, upon determination that the user reuses such nested data items, may thus generate a second generation data item based on the nested data items. Furthermore, the system may also generate a $3^{rd}$ generation data item based on determination of user's reuse of at least one $2^{nd}$ generation data item and at least another data item. Further, advantageously, the system may generate $n^{th}$ generation nested data items based on determination of a user's reuse.

In some embodiments, $n^{th}$ generation data item may be generated based on the combination of the nested data items stored in the system. Thus, for example, the system may advantageously determine that $n^{th}$ generation nested data items are to be generated from entirely data stored in the system.

In some embodiments, the system may acquire one or more $1^{st}$ or $(n-1)^{th}$ generation nested data items from outside source. Such nested data items source may include, but not limited to, third party databases, third party input, and nested data items in public domain. Thus, for example, the system can advantageously determine that $n^{th}$ generation nested data items are to be generated based on nested data items not stored in the system databases before the generation.

In some embodiments, the system may associate one or more nested data items with a particular user or a particular group of users. The system may notify the user when one or more later-generation nested data items are generated or updated from the nested data items associated with such user. The notification or message may include, but not limited to, texts, phone calls, emails, push notifications from software or computer system, regular mails, and express mails.

Various embodiments of the present disclosure provide improvements to various technologies and technological fields. The present disclosure describes improvements to, and useful applications of, database systems. For example, the database system disclosed here, according to various embodiments, efficiently configures databases for user reuses, dynamically generates or updates $n^{th}$ generation nested data items and automatically sends notifications in response to such generations and updates. Additionally, various embodiments of the present disclosure are inextricably tied to computer technology. In particular, various systems and methods discussed herein provide monitoring of electronic databases, processing of large volumes of nested data items, generation and transmission of electronic notifications, and the like. Further, the implementation of the various embodiments of the present disclosure via computer technology can enable many of the advantages described herein, including efficient and accurate processing of various types of electronic data. For example, there are millions of user created content stored as digital objects in a digital domain. Accordingly, embodiments of the system disclosed herein advantageously enable generation of a mapping network of copyright distribution among these digital objects in a database schema. Further embodiments of the system also disclose retrieval of the data items from the mapping network.

In some embodiments, a database system is disclosed for generating $n^{th}$ generation nested data items based on stored or outside source database records. The database system may comprise a plurality of databases with a first database including a plurality of various types of data records; a second database including a plurality of a various types of data records; a third database including a plurality of various types of data records; and at least one hardware processor configured to execute computer-executable instructions.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

In certain embodiments, a database processing system can include a server and a database repository including one or more databases, the server configured to retrieve and store data items in the one or more databases. Further, the database repository can include a first database configured to store a plurality of copyrightable works and copyrightable works data items associated with each of the respective plurality of copyrightable works and the server configured to: receive a first HTTP request from a first computer over a network. The first HTTP request can be a first instruction to store a digital object including a first derivative copyright content. The data repository can store identification data associated with the digital object in the database repository. The data repository can also receive a second HTTP request from the first computer over the network, the second HTTP request comprising a first instruction to identify a first reused content in the first derivative copyright content. The data repository can query the data repository based on the first instruction to identify the first reused content. It can retrieve the first reused content data items based on the query of the database repository and transmit at least some of the first reused content data items to the first computer over the network. In some embodiments, the data repository can map the first reused content with the stored identification data associated with the digital object and transmit, over the network, a message to an owner of the first reused content, the message comprising the identification data associated with the digital object.

Additionally, in certain embodiments, a database processing method executed on a server to retrieve and store data items in the one or more databases of a data repository can include receiving a first HTTP request from a first computer over a network. The first HTTP request can be a first instruction to store a digital object including a first derivative copyright content. Furthermore, the method can include storing identification data associated with the digital object in the database repository. The method can include receiving a second HTTP request from the first computer over the network. The second HTTP request can be a first instruction to identify a first reused content in the first derivative copyright content. The method can include the steps of querying the data repository based on the first instruction to identify the first reused content and retrieving the first reused content data items based on the query of the database repository. The method can include transmitting at least some of the first reused content data items to the first computer over the network. In certain embodiments, the method can further include mapping the first reused content with the stored identification data associated with the digital object.

Moreover, in various embodiments, a database processing system can include a server and a database repository including one or more databases, the server configured to retrieve and store data items in the one or more databases. The server can receive a first network request from a first computer over a network. The first network request can be a first instruction to store a digital object including a first derivative copyright content. The server can store identification data associated with the digital object in the database repository. In some embodiments, the server can further receive a second network request from the first computer over the network, the second network request comprising a first instruction to identify a first reused content in the first derivative copyright content. The server can query the data repository based on the first instruction to identify the first reused content. The server can also retrieve the first reused content data items based on the query of the database repository. In certain embodiments, the server can further map the first reused content with the stored identification data associated with the digital object.

BRIEF DESCRIPTION OF THE DRAWINGS

The following drawings and the associated descriptions are provided to illustrate embodiments of the present disclosure and do not limit the scope of the claims. Aspects and many of the advantages of this disclosure will become more readily appreciated as the same become better understood by reference to the following detailed description, when taken in conjunction with the accompanying drawings, wherein:

FIG. 1 is a block diagram of a database system for dynamic storing and retrieval of nested data items, according to an embodiment.

FIG. 2D shows some other nested data items in the database schema of the database system for dynamic retrieval of nested data items, according to an embodiment;

FIG. 6A shows a user interface of the database system for dynamic retrieval of nested data items, according to an embodiment;

FIG. 6B shows another user interface of the database system for dynamic retrieval of nested data items, according to an embodiment;

FIG. 6C shows another user interface of the database system for dynamic retrieval of nested data items, according to an embodiment;

FIG. 8 shows another user interface for listing updated nested data items of the database system for dynamic retrieval of nested data items, according to an embodiment;

FIG. 10 shows another user interface for updating nested data items of the database system for dynamic retrieval of nested data items, according to an embodiment;

DETAILED DESCRIPTION

Figure 2A:
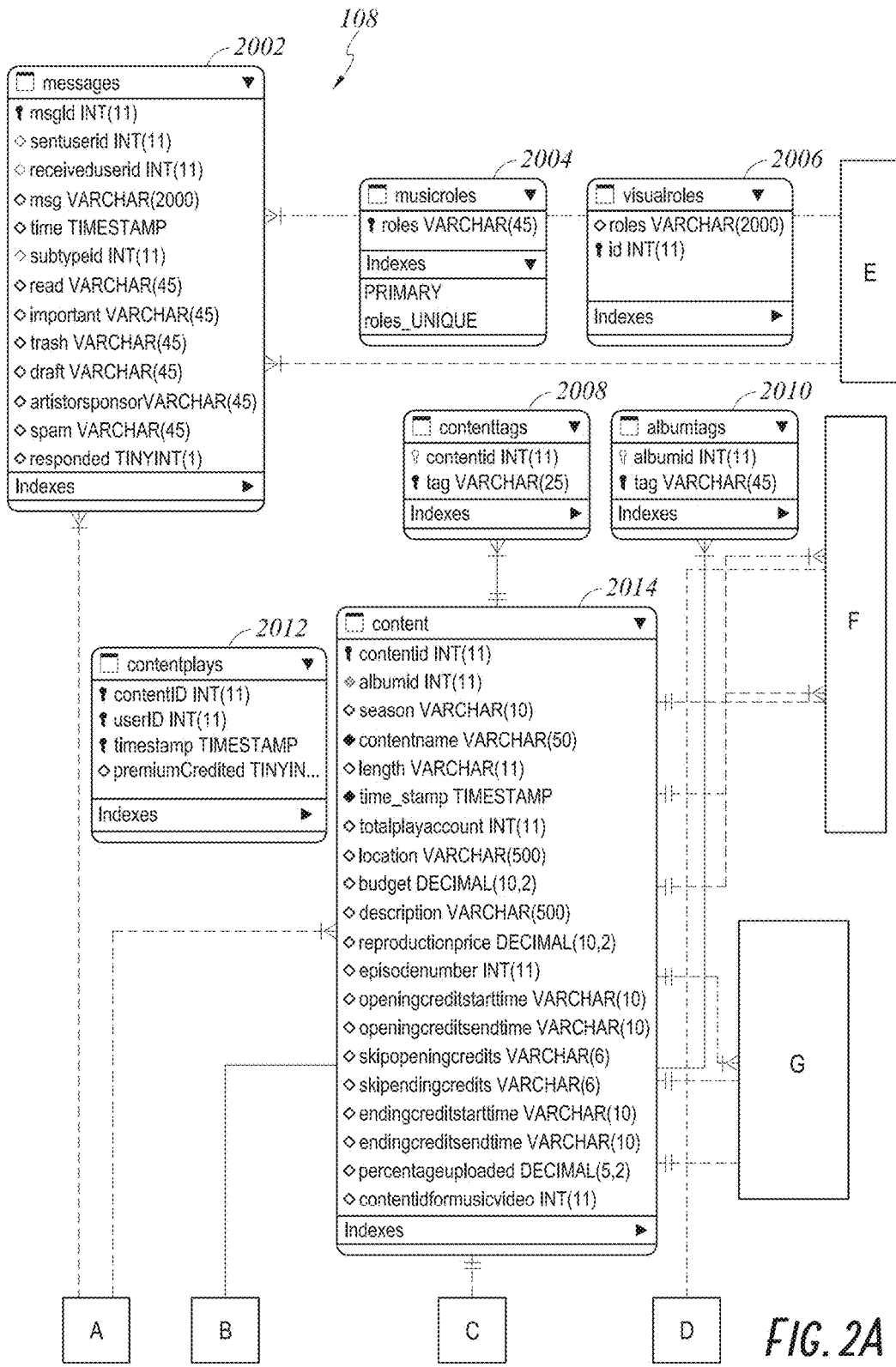
FIG. 2A shows various nested data items in a database schema of the database system for dynamic retrieval of nested data items, according to an embodiment.
Figure 2B:
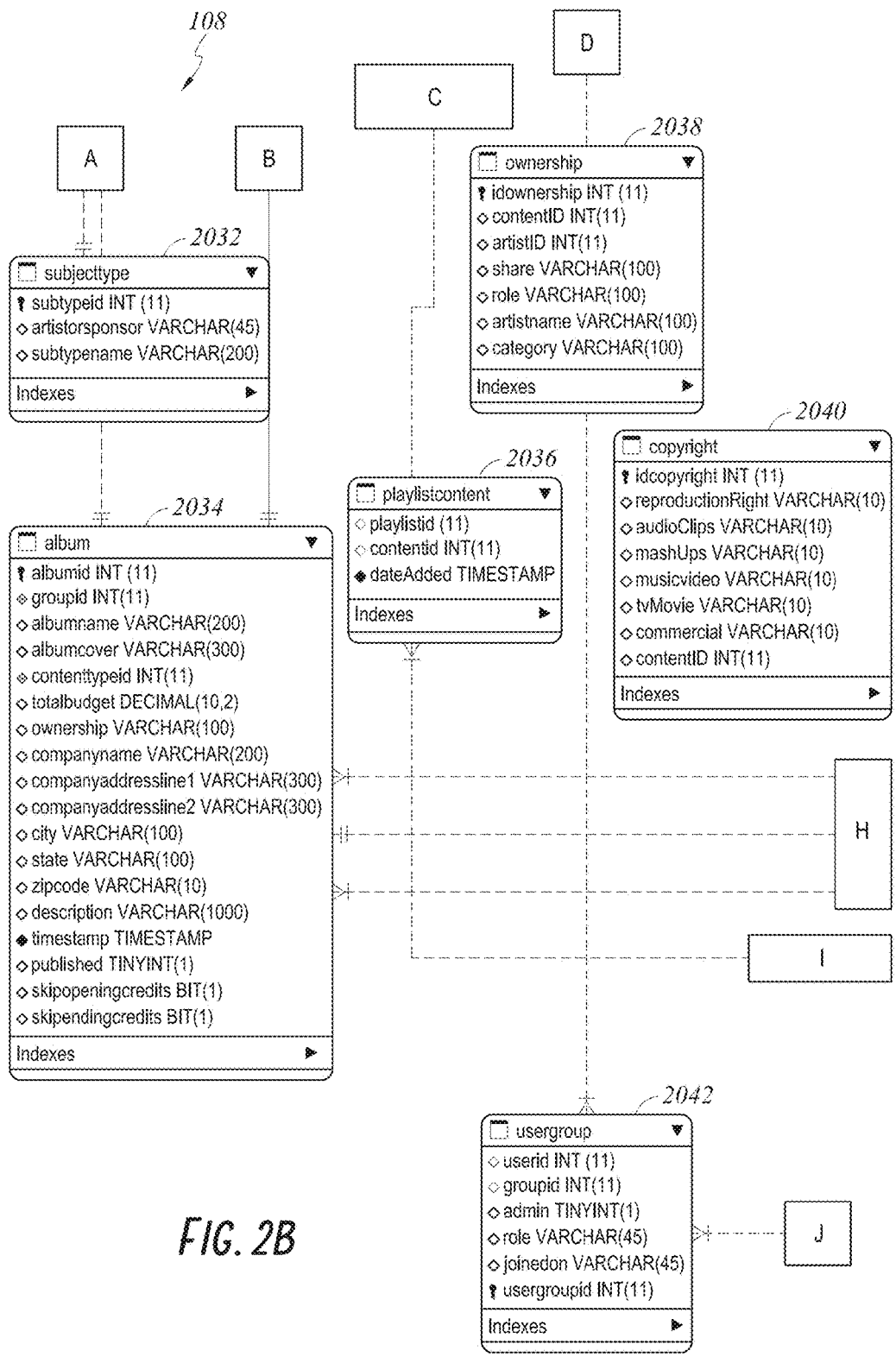
FIG. 2B shows some other nested data items in the database schema of the database system for dynamic retrieval of nested data items, according to an embodiment.
Figures 2, 2C:
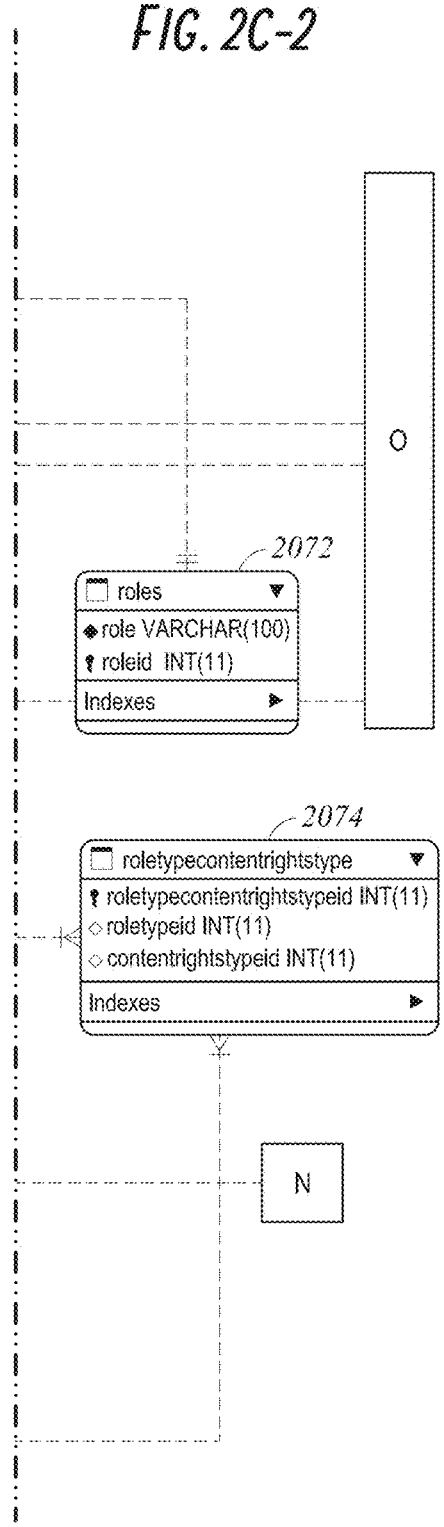
FIG. 2C shows some other nested data items in the database schema of the database system for dynamic retrieval of nested data items, according to an embodiment.
Figure 2E:
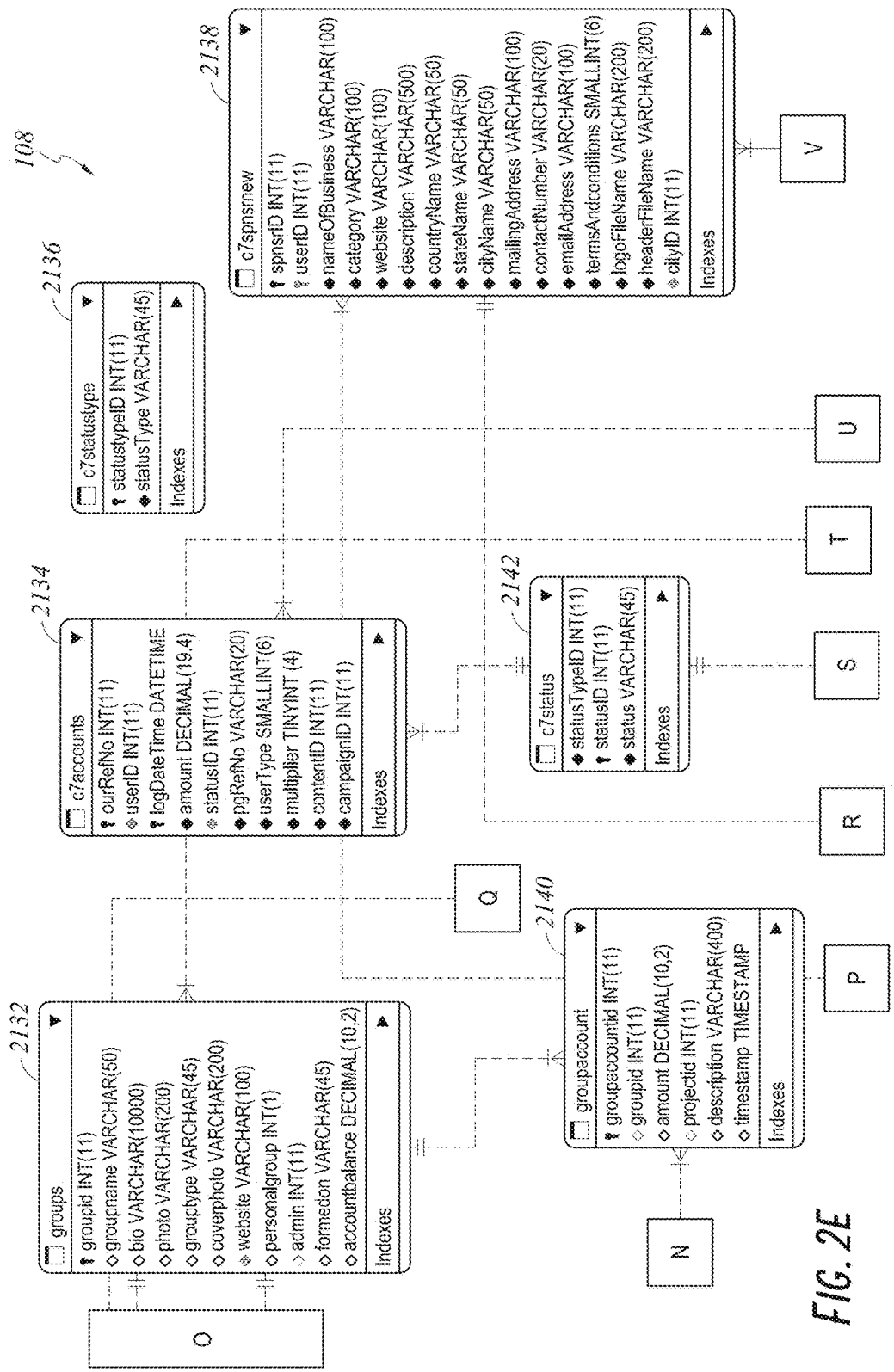
FIG. 2E shows some other nested data items in the database schema of the database system for dynamic retrieval of nested data items, according to an embodiment.
Figure 2F:
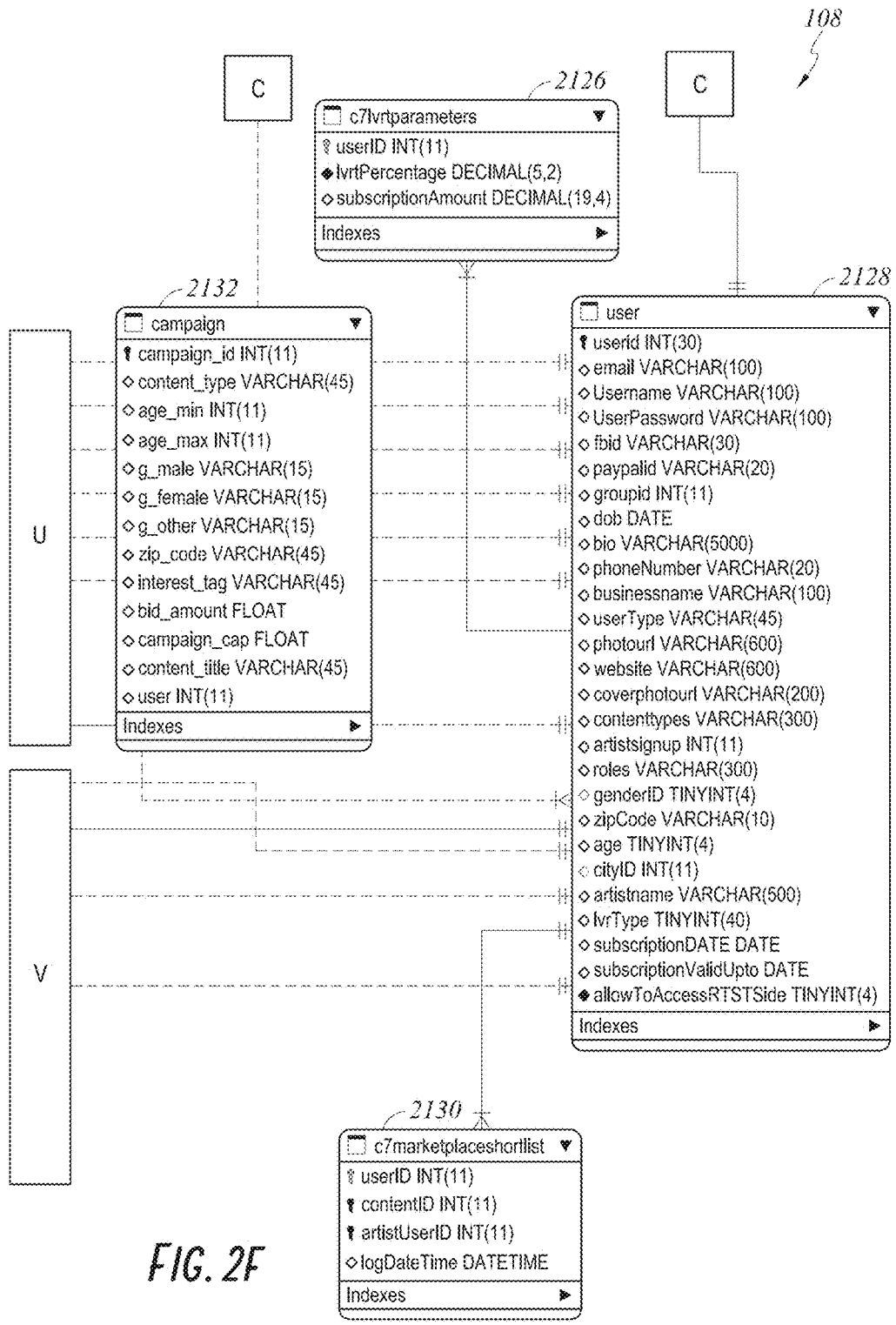
FIG. 2F shows some other nested data items in the database schema of the database system for dynamic retrieval of nested data items, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

To date, copyright licensing has been a highly subjective and manual process, with licenses for use in each derivative work being negotiated on a case-by-case basis. Current processes for licensing copyrightable works do not create rules for licensing subsequent generations of derivative works, and specifically attributing a share of the revenue from the exploitation of future derivative works to the owners of the copyrights in the preceding generations of original works. For example, while a license might be granted for a musician to make a single remix of an original song, there are no rules to enable future derivative uses of the remix while compensating the owners of the copyright in the original song for their contribution to the subsequent works. Therefore if a subsequent would-be licensee would like to obtain the rights to incorporate the remix of the original song into a $3^{rd}$ generation derivative work, for example by incorporating the remix into the soundtrack of a movie, that licensee would have to go back and negotiate one-on-one with both the owners of the $1^{st}$ generation work (the original song), and the owners of the $2^{nd}$ generation work (the remix). As subsequent generations of derivative works accrete, the process becomes exponentially more laborious and time consuming. Furthermore under the current licensing processes, even if hypothetical licensors or their agents have infinite time and energy to consider, approve or disapprove, and document each request for a license, a hypothetical licensee must wait for all of the co-owners of copyrights throughout a chain of derivative works to individually approve a new derivative use in order to legally publish the latest generation derivative work. The net effect of this situation is that many derivative uses of copyrightable works that would get made either never do, or they are made illegally without the permission or compensation of the respective owners of the original works. Furthermore, the large amount of digital objects created and upload on the network increase the complexity of mapping copyrightable components in the digital objects. The database processing system described herein improves the mapping of these copyrightable component in digital objects.

Some embodiments of the present disclosure represent a significant improvement on the process of licensing copyrighted works. In some embodiments, the present disclosure makes the process of licensing copyrights for 3rd, 4th, 5th, and nth generation derivative works, as well as fairly compensating each successive generation of owners, substantially easier for both licensors and licensees, thereby increasing the value of owning copyrights. One embodiment of the present disclosure includes computing rules and database management for copyright licensing. As will be disclosed in detail below, in some embodiments these rules and systems can enable the owners of copyrights to specify only once how they wish to be compensated for derivative uses of their works, and then let the system process all subsequent steps for them, so that they can be compensated fairly in the event their works are licensed infinite times over infinite generations.

In addition to greatly improving the ease and efficiency of licensing derivative works, and making it feasible to license infinite generations of derivative works, some embodiments of the present disclosure enable calculating and transferring royalty payments to rightsholders using a computer system. At the moment, the most common process currently used for remitting payments to rightsholders when revenues are generated from the performances of their works by means of digital streaming is called a pari-mutuel royalty calculation system. In a pari-mutuel royalty system, the streaming service (e.g. Spotify, Apple Music, et. al) collects all of the revenues from subscription fees and ad sales for a given month, puts them into a single pool, takes a cut off the top, and remits the remaining funds to the rightsholders based simply on the number of times each of their works was streamed divided by the total number of plays of all works on the streaming service for that month. Pari-mutuel royalty calculation systems are flawed to the extent they create a bias in favor of the owners of the rights in the most mainstream songs, especially when the streaming platform offers both a premium subscription tier of service and a free ad-supported tier of service, and/or steeply discounted rates for students and other categories of users. These complaints have been documented by a handful of journalists and bloggers, some of whom have argued for a one-to-one royalty calculation system, wherein the royalties generated by a specific user would go directly to the artists whose works that user streamed. Some embodiments disclose a database processing system to address mapping of rights among digital objects.

FIG. 1 is a block diagram of an embodiment of the system for dynamic retrieval of nested data items, according to an embodiment. In some embodiments, one or more of the blocks of FIG. 1 may be optional, and/or blocks may be rearranged.

The Network Database Management System ("the NDMS") 106 connects to one or more user systems 102. The user systems 102 can be implemented on various devices, for example, but not limited to: personal computers, super computers, smartphones, tablets, smartwatches, game consoles and like. The NDMS 106 can update and generate data in one or more databases based on user inputs. The NDMS 106 can have one or more hard drives. In some embodiments, the "load" of the nested data items to be updated in the data repository 108 determines the number of computer servers. The volume of $n^{th}$ generation nested data items to be generated by the NDMS 106 can also determine the number of computer servers.

In some embodiments, the NDMS 106 can have at least three different types of servers: one or more web/application servers, one or more database servers, and one or more content delivery network ("the CDN") servers. The web/application server can be responsible for serving HTML documents for browsers. It can also be responsible for serving HTML documents for native applications. It can also be responsible to responding to requests by user systems 102, running application codes or communicating with database servers. The database server can act as the data repository 108. It can store data updated or generated by the NDMS 106. The CDN server can be a cluster of servers. The CDN server can provide various types of nested data items, such as images, audio and video files.

The NDMS 106 can update data in the data repository 108. In some embodiments, the NDMS 106 can create new data in the data repository 108. The NDMS 106 can also create data in the data repository 108 upon data updates received from one or more users' input. The NDMS 106 can also update data items in the data repository 108 based on pre-stored instructions. For example, one or more users can set instructions using user systems 102. The NDMS 106 can then store the instructions in one or more of the servers. In some embodiments, instructions can relate to achieve efficiency in processing or computing data in the data repository 108.

In some embodiments, the NDMS 106 can generate one or more new $n^{th}$ generation data items in the data repository 108. Such generation may update one or more existing data items associated with the new $n^{th}$ generation data items. The NDMS 106 may also mark the relationship between the new data items and other data items in the data repository 108. Such features and others are intimately tied to, and enabled by, computer technology, and would not exist except for computer technology.

In some embodiments, the data repository 108 can have one or more databases. In some embodiments, the data repository 108 can be deployed using cloud-computing technologies (i.e., a public or a public and private hybrid cloud). The data repository 108 can be advantageously and strategically placed around the world to provide lower latency to end-users. In some embodiments, the data repository 108 can store hundreds of millions (or more) of various types of data. The data in the data repository 108 may include, for example, any updates to the data repository 108. The user system 102 can input data. Upon receiving such input, the NDMS 106 can then update the data in the data repository 108.

In some embodiments, The NDMS 106 can send notifications to certain users. Upon updating data in the data repository 108, the NDMS 106 can send one or more messages to one or more users associated with the data through the network 104. The one or more messages may be sent via, but not limited to, texts, phone calls, and emails, push notifications from software or computer system, regular mails, express mails and like.

Example Operation of the NDMS 106

Now referring to FIG. 2A to 2F, the data repository 108 can store hundreds of millions (or more) of various pieces of data. FIG. 2A to 2F illustrate an example schema. The NDMS 106 can also generate new data. For example, the NDMS 106 can generate new data that did not originally exist in the data repository 108, but was later received from the user system 102 input.

In some embodiments, the data repository 108 can have data associated with management and distribution of copyrighted works. For example, the data repository 108 can store data associated with the Messages table 2002. The NDMS 106 can associate the Messages 2002 with different data, such as message identity, sent user identity, receipt user identity, etc. Various data in the data repository 108 can connect with each other by associating with the same key identifier. For example, various data in the Messages table 2002 can connect with each other by associated with the same key identifier "message identity".

In some embodiments, the NDMS 106 can store data associated with copyrighted work in the content table 2014. Each copyrighted work may have a corresponding unique identifier (unique to the content table 2014) called a "contentid." The "contentid" can be the primary key for the content table 2014. The NDMS 106 can connect the content table 2014 with other tables in the data repository 108 by using "contentid" as the reference for other foreign keys. For example, each copyrighted work of art such as a song, music video, movie or episode of a TV show corresponds to a unique "contentid." Each "contentid" can have a list of "rightsholders" and their associated share of revenue. The NDMS 106 can label this information as "role" in the data repository 108. The data repository 108 can store "roles" in the contentrole table 2064. In some embodiments, the "rightsholders" can input licensing terms allowing other artists to reuse the copyrighted work. The user system 102 can transmit the terms to the NDMS 106. The NDMS 106 can then update or store data associated with such terms in the contentrights tables 2068. Furthermore, the NDMS 106 can also add additional integrity constraints on the contentrole table 2064. For example, the sum of "percentage of copyright" in the contentrole table 2064 must add up to 100 for each contentid. In some embodiments, the NDMS 106 can generate data associated with nth generation derivative works as the NDMS 106 can quickly and reliably calculate each rightsholder's share in the copyrights for each piece of derivative work.

In one embodiment of the NDMS 106, the contentrights table 2068 stores expected royalty for reusing a copyrighted work. The NDMS 106 can store a list of possible methods of reuse of the work in the contentrightstype table 2070. For each "contentid" and "contentrightstype," the NDMS 106 can maintain an entry with the expected royalty in the contentrights table 2068. The NDMS 106 can calculate the royalty due to each rightsholder who owns a share in the original work upon which a derivative work is based, by referencing each work's unique "contentid" in the contentrights table 2068. The NDMS 106 can also prevent a particular type of reuse of a particular copyrightable work by marking the "contentid" row in the contentrightstype table 2070 with a flag. The flag can indicate that this specific reuse type was not allowed.

In some embodiments, the NDMS 106 can store data associated with a list of incorporated works of art in the contentcopyright table 2066 for derivative works. The contentcopyright table 2066 can store a list of mappings between "contentid" and "reusedcontentid." "Reusedcontentid" can be the "contentid" of a reused work. Along with each "contentid" and "reusedcontentid", the contentcopyright table 2066 can also store data associated with terms of reuse. The terms may come from the contentrights table 2068.

In some embodiments, the NDMS 106 promotes licensing of infinite generations of copyrightable works in a scalable, automatic and transparent manner while it maintains the integrity of each agreement at every generation. When a new work of art reuses a preexisting work of art, the NDMS 106 can retrieve the "contentid" of the preexisting work of art. The NDMS 106 can then check the contentrights table 2068 to retrieve expected royalty for the preexisting work of art. Once the expected royalty is agreed upon by the reusing party, they can input such terms through the user systems 102. The user system 102 can transmit the terms to the NDMS 106. The NDMS 106 can update data associated with such terms. The NDMS 106 can then check if the preexisting work is derivative of earlier preexisting works of art. In some embodiments, for each successive preexisting work of art, the NDMS 106 can check if they had incorporated earlier works. The NDMS 106 can check each copyrightable work in a recursive manner until reaching every first generation original work such copyrightable work is based on. The NDMS 106 can add all the rightsholders at each step of recursion to a list. The NDMS 106 can then calculate the royalty to be paid to all rightsholders by using the mapping in the contentcopyright table 2066. The NDMS 106 can update data associated with such royalty information in the data repository 108.

Figure 3B:
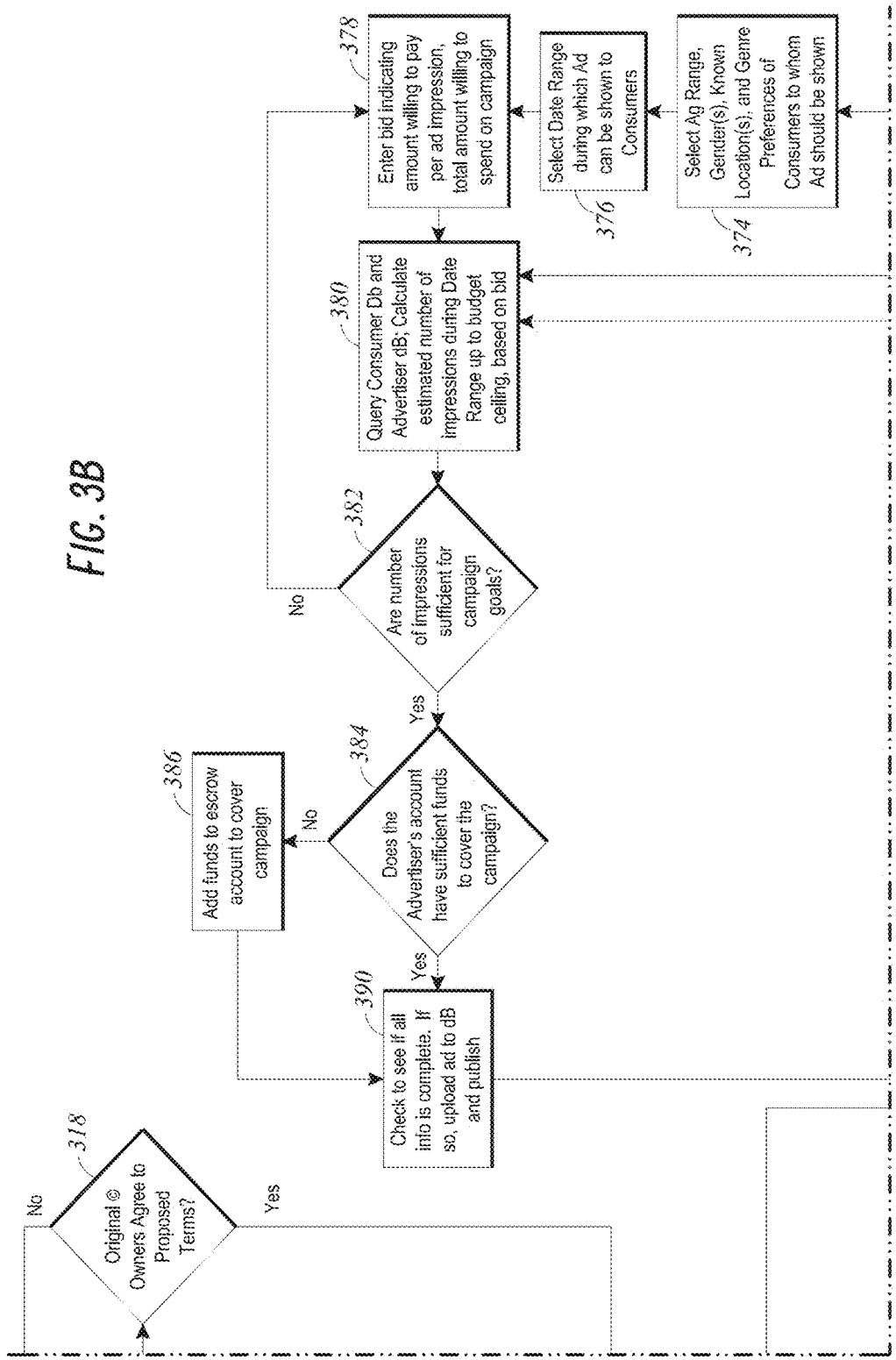
FIG. 3 shows a block diagram for updating nested data items of the database system for dynamic retrieval of nested data items, according to an embodiment.
Figure 3C:
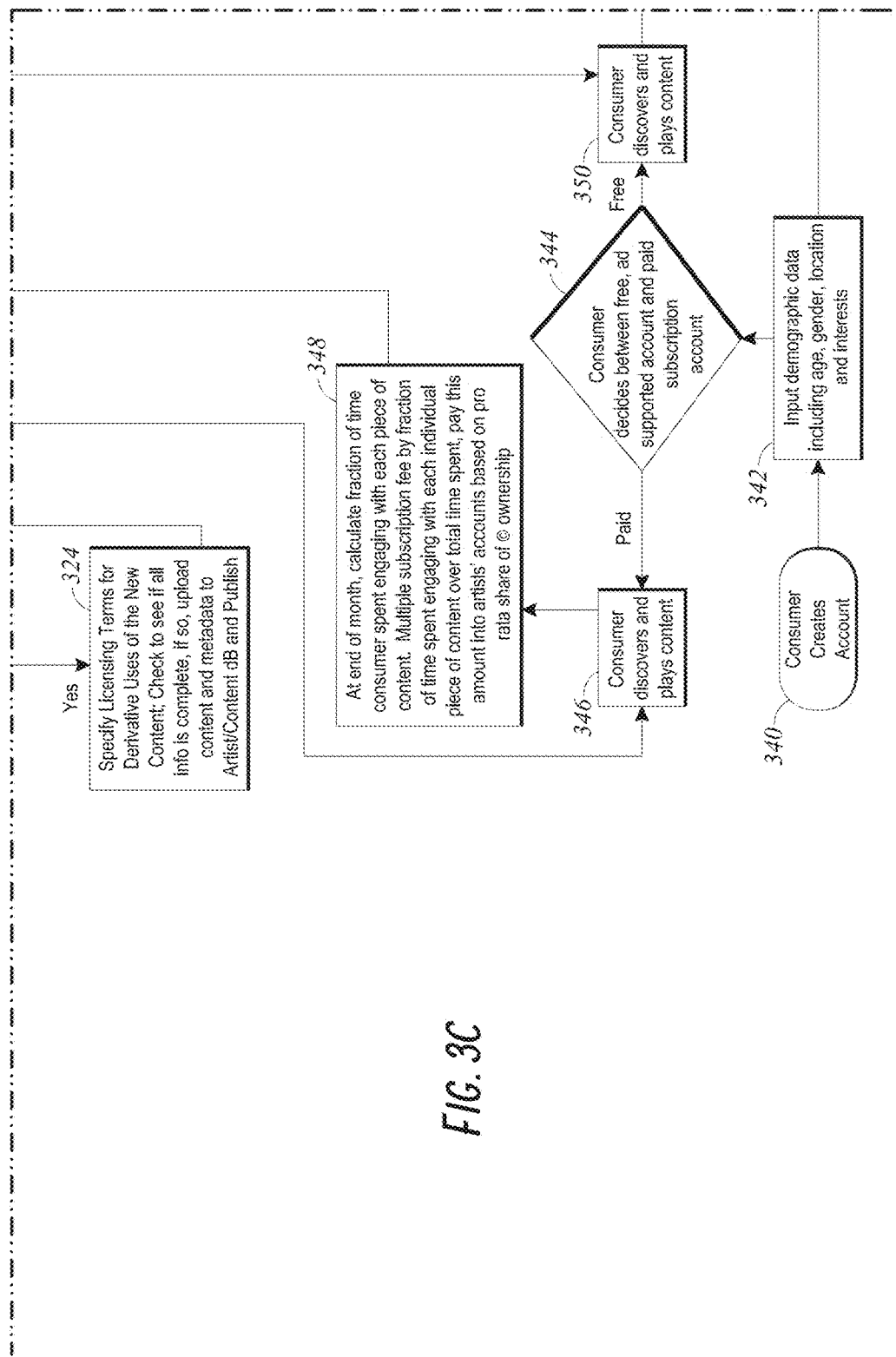
Figure 3D:
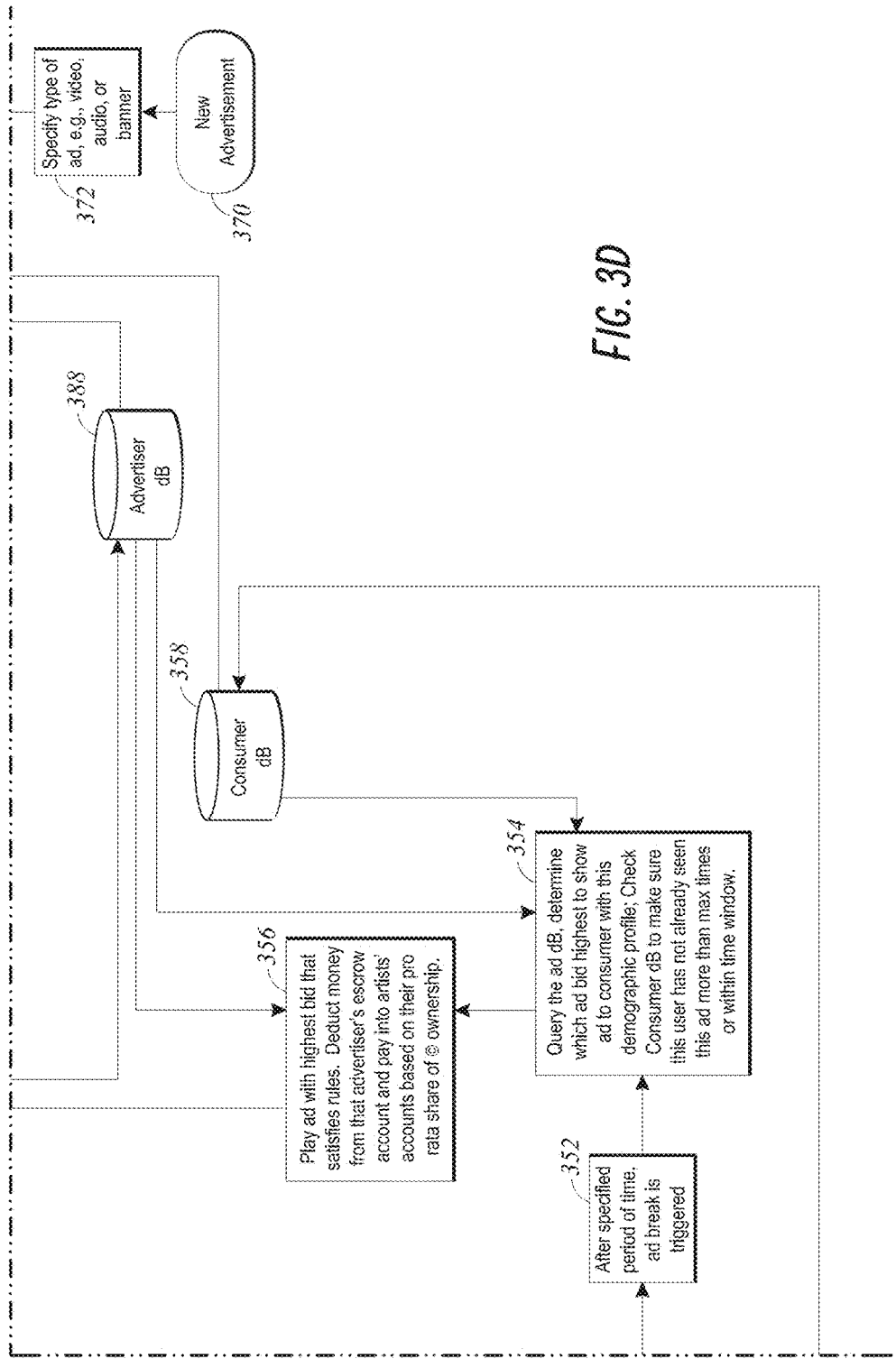

Now referring to FIG. 3, FIG. 3 gives a detailed view of an embodiment of a copyrighted works management and distribution system that is based on the database system for dynamic retrieval of nested data items. In some embodiments, one or more of the blocks of FIG. 3 may be optional, and/or blocks may be rearranged.

In some embodiments, the NDMS 106 can include one or more subsystems. The subsystems can interlock with each other. Each subsystem focuses on updating or generating data associated with different users: artists (and/or rightsholders), users, and advertisers. In some embodiments, there are three subsystems: artist/content subsystem, consumer/user subsystem, and advertiser subsystem. In some embodiments, the data repository 108 includes three or more databases: one or more one artist/content databases, one or more consumer/user databases and one or more advertiser databases.

Artist

The NDMS 106 can update or generate data associated with copyrighted works. Artists can upload works such as, but not limited to, albums, singles, music videos, TV shows and movies. The NDMS 106 can receive these works through the network 104. In some embodiments, the NDMS 106 can convert the works from different formats into one format. This feature may also create various high quality versions (i.e., high definition video, high fidelity audio) and low quality versions of each file. The NDMS 106 can then update or generate data associated with the works in the data repository 108. Such data can include content type, name, owners, owners' shares, and proposed license terms of the associated work and the like. The NDMS 106 can then determine whether such work is a derivative work at 308.

In some embodiments, the NDMS 106 can make the determination based on input by an artist. An artist, when uploading a copyrightable work, can input reuse type, reused work, and licensing terms by using the user system 102. The user system 102 can transmit such information through the network 104 to the NDMS 106. The NDMS 106 can then update data associated with the work in the data repository 108.

In some embodiments, the NDMS 106 can also determine whether the uploaded work is a derivative work by comparing the data being updated with data in the artist/content database. In some embodiments, upon receiving new work from a user system 102, the NDMS 106 breaks the work into pieces of different sizes. It can then compare data in the artist/content database with the pieces. For example, if an artist uploads a song, upon receiving the song, the NDMS 106 breaks the song into different short sections and generates new data associated with the sections. The NDMS 106 can then search the entire databases to match new data with the data in the data repository 108. If the NDMS 106 determines there are sufficiently similarities between the new data and the data in the data repository 108, it can notify the artist that the uploaded work is a derivative work. The NDMS 106 can then display the copyrightedworks that the uploaded work reuses to the artist.

In some embodiments, an artist inputs various pieces of information about the uploaded work at 320, including information regarding reuses. The NDMS 106 can create new data associated with the various information in the artist/content database at 326. The various information can include licensing terms for reuse, revenue shares between owners, and other information. In some embodiments, the NDMS 106 can also ask the artist to input the revenue distribution agreement between right holders of the uploaded work at 322 in the user system 102. The artist can also input proposed licensing terms for reuse of the works at 324. The NDMS 106 can then update all data associated with the agreements or the terms in the artist/content database at 326.

In some embodiments, the NDMS 106 can label a group of artists as a "group." Each group can have one or more administrators, which may be granted the ability to perform administrative tasks like uploading works, adding or subtracting funds to the group's account, and defining copyright shares. When an artist accesses the NDMS 106 for the first time, he/she can be prompted to sign up as an artist. This signup process can be similar to a user signup process but in addition to demographic information, the artist may enter some basic information about the band/group(s) that he/she is part of (See FIG. 6A-6C). This information can include the list of members in the group. The first artist in a group to complete the signup process can be the administrator and can elect other members in the group to be administrators as well. An artist can be a member of multiple groups, or a single group, or the only member of a group. Once the administrator has entered all the required information, the user system 102 can forward all information to the web/application server and subsequently to the database server. The NDMS 106 can update data associated with such information in the data repository 108.

In some embodiments, once the NDMS 106 receives a copyrightable work, the NDMS 106 can break the work down and store different data in different tables in the data repository 108. This process, known as normalization, can eliminate redundancies and some anomalies that may exist otherwise. In some embodiments, the NDMS 106 can store data associated with a list of copyrighted works along with each title and the URL of the corresponding file in the "content" table 2014, and the rightsholders' information in the "contentcopyright" table 2068. The NDMS 106 can store data in any number of combinations of different tables. The NDMS 106 can "join" or "combine" any number of tables to get all the relevant information as a whole and in its original integrity. Such features and others are intimately tied to, and enabled by, computer technology, and would not exist except for computer technology.

Once the NDMS 106 stores all the information, it can send messages to all rightsholders of the copyrighted work. These messages can include terms of revenue shares and percentage ownership of each rightsholder to the work. In some embodiments, all rightsholders must acknowledge the terms in one or more user systems 102 before the NDMS 106 can publish the work. At 320, artists can also set up a revenue distribution plan to distribute revenues from future exploitation of their work.

Once all the rightsholders accept the terms, the user system 102 can upload the digital file associated with each individual piece of work to the NDMS 106. In some embodiments, the file can be in a recognizable format. The NDMS 106 can provide artists with the guidelines of how to convert files to the required format. The user system 102 can send the file as packets of data to the web/application server. The web/application server can forward these packets to the database server. The NDMS 106 can reconstruct the original files using these packets according to TCP/IP protocol. The NDMS 106 also can store unique Uniform Resource Identifiers (URI) for the file in the content table 2014.

Upon detecting that derivative works exist, the NDMS 106 can determine whether there are licensing agreements among all rightsholders. In some embodiments, at 310 and 312, the NDMS 106 can create data associated with the derivative works, including artists' names, roles, and percentages of ownership based on specifications from original works being reused. The NDMS 106 can search data associated with the licensing terms of the original works. The NDMS 106 can ask the rightsholders involved in the derivative work to agree to the licensing terms set by the rightsholders in the original work. If the rightsholders in the derivative work agree, the NDMS 106 can update data reflecting the licensing terms in the contentcopyright table 2066. Furthermore, the NDMS 106 can update new licensing terms at 316 and 318 if the rightsholders of the derivative work and the original works want to negotiate different terms among themselves. At 316, the NDMS 106 can send messages to all rightsholders to inform them of a request to negotiate new licensing terms at 318. After all artists agree on new licensing terms, they can input such terms through one or more user systems 102. The NDMS 106 can then update data associated with the licensing terms at 320.

In some embodiments, the artist/content database can have access to third party copyright databases including, but not limited to: the Harry Fox Agency, the American Society of Composers, Owners and Publishers (ASCAP), Broadcast Music, Inc. (BMI), and SESAC. The NDMS 106 can also send messages to different right holders to get licenses if they are not already in the data repository 108. In some embodiments, artists can also negotiate licensing terms with original copyrightable work right holders that are not already in the artist/content database before they can update works in the NDMS 106. Once a license is acquired, the NDMS 106 can update data associated with licensing terms in the artist/content database.

In some embodiments, an artist can input the digital download price for the work at 306. This amount can be the price that users need to pay for downloading the digital file of the work to their personal devices. Unlike streaming media, where a user can only listen or watch the work using a client application/browser and the user does not get direct access to the file, downloading the file can allow users to store them on their computer and use any compatible application to open these files. The NDMS 106 can generate data associated with the download price in the data repository 108.

This price may be a minimum price, and users can be given an option to pay above the minimum in order to support artists whom they enjoy. Furthermore, this price can be calculated by a process that determines the revenue-maximizing price to charge users for digital downloads, which can predict the product of number of downloads times price at various price levels based on historical data about the artist's past work. The artist can then have the option of selecting the automatically calculated optimum price, or alternatively inputting his or her own into a text box, however the manually selected price might be subject to minimum and/or maximum constraints. Upon receiving the artist's input, the NDMS 106 can update data associated with the download price in the artist/content database.

In some embodiments, all rightsholders can review works before the NDMS 106 publishes the work. If the work of art is a video, the rightsholders can also input data corresponding to times within the video during which advertisements may be displayed while the video being viewed by users. Upon receiving the rules, the NDMS 106 can update data associated with advertisement rules. The insertion times for advertisements that rightsholders can define may be constrained by rules. Examples of rules contemplated include a maximum number of minutes elapsed before an advertisement plays. The NDMS 106 can determine the length of the video and divide the length in minutes by the maximum number of elapsed minutes; this quotient would equal the number of advertisements for which the user is forced to specify the timecodes based on the rules. Another rule contemplated can preclude rightsholders from placing any two advertisements within a minimum length of time apart from one another.

After artists upload the files to the NDMS 106, the NDMS 106 can present all artists a series of options to distribute their works on third party platforms. Using the APIs of these third party systems, the NDMS 106 can then forward the digital media files uploaded by the artists, and also forward the requisite metadata (e.g., song titles, album titles) to the third party distribution services over the network 104. The operator of the NDMS 106 can take a small fee for their forwarding, rights-management, accounting, and other services. The NDMS 106 can then deposit the remaining monies received from the third party services into the artists' accounts based on their pro-rata shares of the copyrights in the works involved.

User

In FIG. 3, the NDMS 106 can give users access to copyrighted works including, but not limited to: literature, audio and video works. In some embodiments, users can access the consumer/user subsystem through one or more user systems 102. This can be achieved by applications on personal computers, super computers, smartphones, smartwatches, tablets, laptops, TVs and game consoles (this list is not exhaustive).

At block 340, the NDMS 106 can ask a user to create a new account in the NDMS 106 in order to access various works. Upon receiving the user's input through the network 104, the NDMS 106 can create various new data associated with the user in the consumer/user database at block 342. Such data may include demographic data associated with the user such as age, gender, location, interest, activities, and payment preferences. If a user chooses the paid subscription option, the user is prompted to enter his/her credit card information, PayPal account information, bank account information or other electronic payment information. These lists are not exhaustive. At block 342, in some embodiments, the NDMS 106 can also access browser history or other information such as GPS data and operating system version on the user system 102 and generate new data associated with the consumer in the consumer/user database 358. For additional security, the NDMS 106 can encrypt and pass the payment information in a secure HTTP request.

The NDMS 106 can then update the data associated with the user's payment preferences and other information at 344 in the consumer/user database 358. If the user wants to access works in the NDMS 106, the NDMS 106 can compare the user's data with the data in the data repository 108. If the user's data matches with a paid subscription preference, the NDMS 106 can provide copyrightable work data items to the user system 102 at 346 free of advertisement. The NDMS 106 can also determine the works to be sent to the user based on the data associated with the user.

In some embodiments, the NDMS 106 can update data items associated with a user's payment preference upon a triggering event. A user can set the triggering event. In any event, the NDMS 106 can then update data in the consumer/user database. It can then make the determination at 344 and update data items in the data repository 108 accordingly.

In some embodiments, the NDMS 106 can automatically send a message to a user upon detecting data associated with a payment method indicating such payment method is invalid. Invalid payment methods can include inaccurate payment account information, and insufficient funds in the account. This list is not exhaustive.

The NDMS 106 can present a user with a HTML document if the user logs in via web browser. The NDMS 106 can also present the user a dynamic homepage if the user is accessing the service from a native application on a computer, smartphone, tablet, smartwatch or video game console. In some embodiments, the document/application can display a graphical user interface, which can enable the users to interact with the NDMS 106 and play audio and video files on their devices. Users can request an audio or video file by performing an action such as a touch on the screen or a click of a mouse button at 346 or 350 in user systems 102. The NDMS 106 can receive this request and the web/application server can make an entry in the databases. This information can be useful to identify which artists are owed a share of advertising revenue. It is also useful for the NDMS 106 to recommend similar content to the user in the future. The web/application server can then identify the location of the requested media file, and respond with chunks or packets of the media data. The requesting browser/application can use these chunks as they are received and provide playback for the user. The connection between the client and the NDMS 106 can be kept alive until the termination of playback occurs.

In some embodiments, as a user accesses works, the NDMS 106 can keep track of each piece of work that he or she consumes. A user can also "favorite" a song or video by performing an action such as a click or touch on an icon during playback. (See FIG. 12) With a user's prolonged use, the NDMS 106 can build up a substantial catalog of information in the database about the user's taste in music and videos content. The NDMS 106 can process the information by collaborative filtering recommendation algorithms, which can suggest other content to the user.

The NDMS 106 can also recommend content to a user at 346 or 350. A user can also use a search engine and/or an interactive browsing interface to peruse the catalog of work that has been uploaded by artists at 346 or 350. The user can type keywords that relate to the kind of media they would like to listen to or watch. The user system 102 can transmit this information to the web/application server. The web/application server can then query the database to find media that matches the user's keywords. The NDMS 106 can send the results back to the browser/native application of user systems 102, which can display them on the user's device. At block 358, upon matching payment preference data items with user records, the NDMS 106 can also provide copyrighted works to the user system 102 free of advertisements at 346.

At block 354, the NDMS 106 can determine an advertisement to be sent to a user at block 356. At block 354, the NDMS 106 can access the advertisement database. It can further match users and advertisements based on data associated with certain criteria. For example, in some embodiments, the criteria can be one or the combination of any of the following: age, gender, location, interest, activities, and browser history associated with users, etc. The NDMS 106 can update data to associate with a highest bidding advertiser to target a user at 356. It can also then deduct funds or credits from advertiser's account.

In some embodiments, the NDMS 106 can distribute revenue generated from a user with a paid subscription account or premium account in the following manner: first the operator of the NDMS 106 can take a percentage off the top as revenue. The remaining portion of the individual user's monthly subscription fee can be split between the individual pieces of work consumed by the user that month, according to the fraction of minutes spent engaging with each piece of work over the total number of minutes spent engaging with all work in the month. The portion allocated to each individual piece of work can be then split amongst the owners of the copyrights associated with each piece of work according to their pro rata ownership shares. An example of a SQL Stored Procedure for calculating and storing micropayments from premium subscriptions to rightsholders can be found below:

```
CREATE DEFINER='bf5801b11eda7e'@'%' PROCEDURE
'c7subscriptionAmountInsert'(
in prmMonth tinyint
,in prmYear smallint
,out prmMessage varchar(200)
BEGIN
if not exists (select month from c7premiumbatchCredit
    where month=prmMonth and year=prmYear) then
begin
select subscriptionAmount,lvrtPercentage into @subscriptionAmount,@prmLvrtPercentage from
    c7lvrtparameters;
set                               @lrvtAmt=convert
    (((@subscriptionAmount*@prmLvrtPercentage/100),
    decimal(19,4));
set    @remainingAmt=convert(@subscriptionAmount−
    @lrvtAmt,decimal(19,4));
create TEMPORARY TABLE userCountTemp(userID int
    not null,userCount int not null);
insert into userCountTemp (userID,userCount)
(SELECT    contentplays.userID,count(contentplays.userID) FROM
heroku_3f1d50c99593ec6.contentplays
inner join user on contentplays.userID=user.useriD where
month(contentplays.timestamp)=prmMonth
and year(contentplays.timestamp)=prmYear and lvrType=10
``` and convert(contentplays.timestamp,date) between subscriptionDate and subscriptionValidUpto
group by contentplays.userID);
create temporary table contentCountTemp(userID int not null,contentID int not null,contentIDCount int, unitCost decimal(19,4));
insert into contentCountTemp(userID,contentID,contentIDCount, unitCost)
(SELECT
contentplays.userID,contentID,count(contentplays.contentID),convert(((@remainingAmt/userCount),decimal(19,4)) FROM
heroku_3f1d50c99593ec6.contentplays
inner join userCountTemp on contentplays.userID=userCountTemp.userID
where month(contentplays.timestamp)=prmMonth and year(contentplays.timestamp)=prmYear
group by userCountTemp.userID,contentplays.contentID);
create temporary table contentAmtTemp(contentID int not null, contentWiseAmt decimal(19,4));
insert into contentAmtTemp(contentID,contentWiseAmt)
(select contentID,convert(sum(unitCost*contentIDCount),decimal(19,6)) from contentCountTemp group by contentCountTemp.contentID);
(select @subscriptionAmount*count(userID) into @totalSubscriptionCollectionAmt from userCountTemp);
/*lvrt amt credit call begin*/
call c7resourcesSelectForParamValue('lvrtUserID',@lvrtUserID);
call c7resourcesSelectForParamValue('lvrtSubscriptionCredit',@lvrtSubscriptionCredit);
call c7accountsInsertForLvrtAmtCredit(@lvrtUserID, @lrvtAmt*(select count(userID) from userCountTemp),@lvrtSubscriptionCredit,1,0);
/*lvrt amt credit call end*/
set @str='';
while exists (select contentID from contentAmtTemp where
locate(contentID,@str)=0 limit 1) do
begin
select contentID,contentWiseAmt into @prmContentID,@prmContentWiseAmt from contentAmtTemp where
locate(contentID,@str)=0 limit 1;
set @str=concat(@str, (select concat(contentID) from contentAmtTemp
where locate(contentID,@str)=0 limit 1), ',');
call c7resourcesSelectForParamValue('SubscriptionCredit', @SubscriptionCredit);
call c7resourcesSelectForParamValue('RT ST',@prmUserType);
insert into c7accounts(userID,amount,logDateTime,userType,statusID,multiplier,contentID,campaignID)
(select userID,convert(((convert(@prmContentWiseAmt, decimal(19,4))*roletype.percentageofcopyright/100)* (contentrole.percentageofcopyright/100)),decimal(19, 4)),now( ), @prmUserType,@SubscriptionCredit,1, @prmContentID,0 from
heroku_3f1d50c99593ec6.contentrole
inner join heroku_3f1d50c99593ec6.roletype on contentrole.roletypeid=roletype.roletypeid
where contentrole.contentID=@prmContentID
and contentID in (select contentID from contentplays
inner join user on contentplays.userID=user.userID
where month(contentplays.timestamp)=prmMonth
and year(contentplays.timestamp)=prmYear and lvrtType=10
and convert(contentplays.timestamp,date) between subscriptionDate and subscriptionValidUpto)
);
end;
end while;
call c7PremiumBatchCreditInsert(prmMonth,prmYear);
select sum(amount) into @totalSubscriptionCreditedAmt from c7accounts where statusID=@SubscriptionCredit or statusID=@lvrtSubscriptionCredit;
set prmMessage=concat('Premium Amount credited','|', @totalSubscriptionCollectionAmt,'|',@totalSubscriptionCreditedAmt);
end;
else
begin
set prmMessage=concat('Premium Amount already credited of',cast(prmMonth as char),' ',cast(prmYear as char));
end;
end if;
END Secondary Digital Object Distribution In FIG. 3, an advertiser can upload a new advertisement at 370. The advertiser can upload an advertisement and other information associated with the advertisement at 372 in the user system 102. The type of advertisements can be video, audio, or banner (display). At 374, upon receiving such input, the NDMS 106 can update data associated with the advertisement. Such data can be associated with a specific age range, such as 5-10, 10-15, 15-18, 18-30, 30-110, and so on (this list is not exhaustive). An advertiser can change such age range at any time to any age group. Such data can also be associated with the locations, and genre preferences of users. An advertiser can input a date range at 376. Upon receiving the input, the NDMS 106 can update data in the data repository 108.

At 378, an advertiser can input a bidding number to indicate the amount such advertiser is willing to pay per advertisement impression (or click). Upon receiving such number, the NDMS 106 can update data associated with the advertisement. The data can also indicate the amount an advertiser is willing to spend in total on a campaign. At 380, the NDMS 106 can access the consumer/user database and create data for estimated number of impressions to be displayed according to the advertiser's input by accessing and comparing other advertisement data in advertisement database 388. The NDMS 106 can query the advertiser and consumer/user databases and create an advertisement plan based on (1) the number of users in the target demographic, (2) how much time each user spends on average consuming work (and therefore how many advertisements he or she can likely trigger), and (3) the number of advertisements with higher bids targeted to those users, how many impressions the campaign is likely to generate over the date range at 380. The web/application server can report this information back to application in the browser/client device of the user system 102, which can present this information to the advertiser who can modify the bid, campaign expenditure or date range, or choose to approve the campaign given the estimated impressions at 382. The NDMS 106 can then update data accordingly.

The NDMS 106 can then determine whether advertiser has enough funds or credit to pay for the campaign at 384. Upon a determination of insufficient funds or credit, the NDMS 106 can send a message to the advertiser and ask the advertiser to add funds or credit into the associated account. Upon determination of sufficient funds or credit, the NDMS 106 can update data items associated with the advertisement and the plan at 390 into the advertisement database 388.

In some embodiments, the advertisement database can also connect to a third-party database. The NDMS 106 can access third party databases to update or create new advertisement data. The third party database can be an advertisement agency database. Such updated or new data can be used to bid for impressions at 380. The NDMS 106 can also use such data to determine sufficiency of impressions of other advertisements at 382.

In some embodiments, when a user with a non-paid subscription account accesses a set of works, the NDMS 106 can trigger an advertisement at 354 after the user has played the works for a certain period of time. The NDMS 106 can keep track of the period by receiving periodical requests such as a HTTP POST. For example, after the user listens to 30 seconds of a song, the user system 102 can send an asynchronous request to the web/application server with the user ID, media ID, amount of playback time completed (30 seconds in this case) and the current time. Alternatively, this information can be stored in a user device or browser and sent to the web/application server for persistent storage after a preset criterion is triggered, such as a specific amount of time has elapsed or when the user exits the application. This can reduce the number of network requests, allowing the NDMS 106 to operate more efficiently, which is particularly useful under circumstances when there is limited bandwidth. In either case, such network requests can happen in the background and the user may not be aware of them. The database server can then store this information in the data repository 108. For illustration, the Pseudo-Code for requesting and serving advertisements can be found below:

1a) Pseudo-Code for Requesting an Audio Ad (from a Client to Server)
TotalSongsPlayed=0;
NumberOfSongsToTriggerAd=3; //This constant can be varied while(The user plays songs){
  Keep track of songs being played;
  if(TotalSongsPlayed>=NumberOfSongsToTriggerAd){
    Make HTTP Request to the web/application server with data: {adType: audio, userID: userID of user}
    On receiving response, play audio ad;
    Disable controls so user cannot pause/skip audio ad;
    TotalSongsPlayed=0;
  }
  Increment TotalSongsPlayed by 1;
}
1b) Pseudo-Code for Requesting a Video Ad (from a Client to Server)
while(The user watches videos){
  ListOfAdInsertTimes=Get ad insert times from server for current video;
  if(current video time>=any of the ad insert times in ListOfAdInsertTimes)
    Make HTTP Request to the web/application server with data: {adType: video, userID: userID of user}
    On receiving response, pause current video;
    Play video ad;
    Disable controls so user cannot pause/skip video ad;
    Remove current ad insert time from ListOfAdInsertTimes;
    Resume previously playing video at the exact time it was paused;
  }
}
1c) Pseudo-Code for Responding to an Ad Request (from a Server to a Client)
Listen for incoming requests
if(the request is an ad request){
  adType=Get ad type requested from the data in the request;
  userID=Get user ID from the data in the request;
  Query the ad database to see which ad to play; (See SQL Stored Procedure for determining what ad to play)
  ListOfSongsPlayed=Get list of songs since last ad request for userID;
  Get the bid amount for the ad and deduct it from advertiser account;
  Divide bid amount among the rights holders in ListOfSongsPlayed and credit it to their respective accounts;
  Respond to client with URL of video/audio ad
}

When it is time for an advertisement to be played, a user system 102 can send a request to the web/application server with the type of advertisement needed (audio or video) and the user ID of the user at 350. In order to determine which advertisement to play, the web/application server can access the advertisement database to see which advertiser bid the most to play an advertisement to a user fitting this particular demographic characteristics user's (based on the received user ID from the request). The NDMS 106 can also cross reference the advertisement with the highest bid with the consumer/user database to see if the advertisement has already been played more than a set number of times or within a set period of time for this particular user. If either of these conditions is met, the NDMS 106 can check the advertisement with the next-highest bid for the same conditions. The NDMS 106 can transmit the advertisement with the highest bid that meets neither condition to the user system 102. One example of a SQL Stored Procedure embodying the method for selecting which advertisement to play is included below:

CREATE DEFINER='bf5801b11eda7e'@'%' PROCEDURE
'c7campaignsSelectForServeAd'(
/*Outputs the URL, title of the advertisement and the logo URL and website of the advertiser*/
out prmFileName varchar(200)
,out prmCampaignTitle varchar(100)
,out prmLogoFilename varchar(200)
,out prmWebsite varchar(100)
/*Input needed are the user ID for whom the ad is requested, the ad type(audio/video/picture), and a comma separated list of content ID's that have been played by the user since the last ad play*/
,in prmUserID int
,in prmAdTypeID int
,in prmContentIDStr varchar(1000))
BEGIN
SELECT c7campaigns.campaignID,filename,campaignTitle
,logoFilename,website into
@campaignID,@filename,@campaignTitle,@logoFilename,@website FROM c7campaigns
left join c7campaigntags as zpTags on c7campaigns.campaignID=zpTags.campaignID

```
and zpTags.type=1
left join c7campaigntags as genreTags on
   c7campaigns.campaignID=genreTags.campaignID
and genreTags.type=11
left join c7campaigntags as cityTags on
   c7campaigns.campaignID=cityTags.campaignID
and cityTags.type=21
left join c7campaigntags as stateTags on
   c7campaigns.campaignID=stateTags.campaignID
and stateTags.type=41
left join c7campaigntags as countryTags on
   c7campaigns.campaignID=countryTags.campaignID
and countryTags.type=31
inner join c7spnsrnew on
   c7campaigns.spnsrID=c7spnsrnew.spnsrID
left join c7campaignuser on
   c7campaigns.campaignID=c7campaignuser.campaignID
   and c7campaignuser.userid=prmUserID
inner join c7adtype on
   c7campaigns.adTypeID=c7adtype.adTypeID
where
c7campaigns.statusID=102000
and
(
(geoTarget=0) /*no geoTargeting*/or
or
(zpTags.zipcode=111111 or zpTags.zipcode in (select
   user.zipcode from user where userID=prmUserID))
or (cityTags.cityID=299411 or cityTags.cityID in (select
   user.cityID from user where userID=prmUserID))
or (stateTags.stateID=521 or stateTags.stateID in (select
   usercity.stateID from user
inner join c7city as userCity on
   user.cityID=usercity.cityID where
   userID=prmUserID))
or (countryTags.countryID=11 or countryTags.countryID
   in (select userstate.countryID from user
inner join c7City as userCity on
   user.cityID=usercity.cityID
inner join c7state as userState on
   usercity.stateID=userstate.stateID
where userID=prmUserID)))
and        (c7campaigns.genderID=21        or
   c7campaigns.genderID=(select genderID from user
   where userID=prmUserID))
and genreTags.tagID in (select tagID from c7usertags
   where userID=prmUserID)
and (select age from user where userID=prmUserID)
   between minTargetAge and maxTargetAge
and       maxTimes>=(select        ifnull(count
   (c7campaignuser.campaignID),0)        from
   c7campaignuser
where
   c7campaignuser.campaignID=c7campaigns.campaignID
   and c7campaignuser.userID=prmUserID)
and c7campaignuser.adTypeID=prmAdTypeID
and campaignLimit>=counter
and (c7campaignuser.logDateTime is null or date_add
   ((select   max(c7campaignuser.logDateTime)   from
   c7campaignuser
where
   c7campaignuser.campaignID=c7campaigns.campaignID
   and
c7campaignuser.userID=prmUserID),interval repeatInt-
   erval hour)<now( ))
and                        (c7campaigns.bidAmount/
   c7adtype.adDisplayMinTimes<=(select sum(amount
multiplier)    from    c7accounts    where
   userID=c7spnsrnew.userID))
and convert(now( )date) between campaignStartDate and
   campaignEndDate order by bidAmount desc,counter
   asc limit 1;
if found_rows( )>0 and @filename is not null then
begin
   set prmFileName=@filename
   ,prmCampaignTitle=@campaignTitle,
      prmLogoFilename=@logoFilename,
      prmWebsite=@website;
   /*The following procedure inserts the userID, campaig-
      nID so that the NDMS 106 knows not to play this ad
      again for a set period of this for this user*/
   call
   c7campaignUserInsert(prmUserID,@campaignID,
      prmContentIDStr);
end;
end if;
END
```

In some embodiments, users can access advertisements in the same way as other works. However, to ensure that a user cannot skip the advertisement, the control buttons like play, pause, skip and stop may be disabled during playback of an advertisement. Once the advertisement is complete, the user may use these controls again. The NDMS 106 also can make an entry in the artist/content and consumer/user databases of what advertisement was played to which user during what time.

In some embodiments, the operator of the NDMS 106 can take a percentage of the money for the advertisement off the top immediately as revenue. The remaining money for the advertisement can be divided across the copyrighted works that have been played during the consumption session. For example, if a user listens to three songs and then an advertisement was triggered, the NDMS 106 can split advertisement revenue in six ways between the right holders of the musical composition and sound recording copyrights in the three songs. Then, the portion allocated to each copyrighted work can be deposited into the accounts of the right holders of the copyright in that work according to their pro rata shares. One example of a SQL Stored Procedure for calculating and storing micropayments from advertisements to rightsholders can be found below:

```
CREATE DEFINER='bf5801b11eda7e'@'%' PROCEDURE
'c7accountsInsertForArtistAmtCreditNew'(
in prmCampaignID int
,in prmContentIDStr varchar(1000) )
BEGIN
call c7resourcesSelectForParamValue('lvrtUserID',@lvrtUserID);
SELECT bidAmount,adDisplayMinTimes into
@prmBidAmount,@prmAdDisplayMinTimes FROM
heroku_3f1d50c99593ec6.c7campaigns
inner join heroku_3f1d50c99593ec6.c7adType on
c7campaigns.adTypeID=c7adType.adTypeID where
campaignID=prmCampaignID;
select lvrtPercentage into @prmLvrtPercentage from
heroku_3f1d50c99593ec6.c71vrtparameters where userID=@lvrtUserID;
set @prmPerClickAmt = @prmBidAmount / @prmAdDisplayMinTimes;
set @prmLvrtPerClickAmt =(@prmPerClickAmt * @prmLvrtPercentage
/100);
SET @RemainingPerClickAmt = @prmPerClickAmt –
@prmLvrtPerClickAmt;
/* spnsr amt dedit call begin */
call c7resourcesSelectForParamValue('adDebited',@adDebitedStatus);
select userID into @spnsrUserID from c7campaigns
inner join c7spnsrnew on c7campaigns.spnsrID=c7spnsrnew.spnsrID
where campaignID=prmCampaignID;
call
```

-continued

```
c7accountsInsertForSpnsrAmtDebit(@spnsrUserID,@prmPerClickAmt,
@adDebitedStatus,-1,prmCampaignID);
/* spnsr amt dedit call end */
/* lvrt amt credit call begin */
call
c7resourcesSelectForParamValue('lvrtAdCredited',
@lvrtAdCreditedStatus);
call c7accountsInsertForLvrtAmtCredit(@lvrtUserID,
@prmLvrtPerClickAmt,@lvrtAdCreditedStatus,1,prmCampaignID);
/* lvrt amt credit call end */
/* Artist amt credit call begin */
call c7resourcesSelectForParamValue('RTST',@prmUserType);
call c7resourcesSelectForParamValue('adCredited',@adCreditedStatus);
select ROUND (
    (
      LENGTH(prmContentIDStr)
      - LENGTH(REPLACE ( prmContentIDStr, ",", "") )
    ) / LENGTH(",")) into @contentIDCount;
set @contentIDCount=@contentIDCount+1; /* last content ID purpose we
Added one */
set @RemainingPerClickAmt = @RemainingPerClickAmt
/@contentIDCount;
set @currentIndex =0;
set @prevIndex =0;
set @value ='';
set @exit =0;
set @separatorLen =0;
set @separator =',';
set @separatorLen=length(@separator);
set @prevIndex=0;
while @exit=0 do
begin
    set @currentIndex =
locate(@separator,prmContentIDStr,@prevIndex+1);
    if @currentIndex = 0 then
      begin
        set @value =
SUBSTRING(prmContentIDStr,@prevIndex+case when @previndex=0
then 1 else @separatorLen end, length(prmContentIDStr) - @prevIndex);
        set @exit=1;
      end;
    else
      set @value = SUBSTRING(prmContentIDStr,@prevIndex+
case when @previndex=0 then 1 else @separatorLen end,
@currentIndex -
@prevIndex -case when @previndex=0 then 1 else @separatorLen end);
        end if;
insert into
c7accounts(userID,amount,logDateTime,userType,statusID,multiplier,
contentID,campaignID)
( select userID,convert((((@RemainingPerClickAmt *
roletype.percentageofcopyright /100) * (contentrole.percentageofcopyright
/100)),decimal(19,6)),now( ),@prmUserType,@adCreditedStatus,1,
@value,prmCampaignID from heroku_3f1d50c99593ec6.contentrole
inner join heroku_3f1d50c99593ec6.roletype on
contentrole.roletypeid=roletype.roletypeid
where contentrole.contentID=@value);
/* Artist amt credit call end */
select @value;
    set @prevIndex = currentIndex;
end;
end while;
end
```

The NDMS 106 can store all payments from advertisers and paid subscription users in an interim (escrow) bank account. The NDMS 106 can send payments to the bank accounts of rightsholders by interacting with the software APIs that one or more banks provide. When advertisers and users enter their credit card/bank account information and consent to a payment, that information can be forwarded to the bank API in a secure HTTPS request. The bank can authorize their credit card/bank account and transfer funds into the interim account. The NDMS 106 can then update data associated with the bank account in the artist/content database. When advertisements play, the NDMS 106 can keep track of the exact amount of revenue that is generated from these advertisements. Furthermore, the NDMS 106 can also keep track of viewership from paid subscription users and calculate revenue for those artists from the paid subscription users. Once a threshold (fixed amount of time or fixed amount of revenue) is reached, the NDMS 106 can deposit the funds from the interim account into the corresponding bank accounts of the artists/rightsholders.

Figure 4:
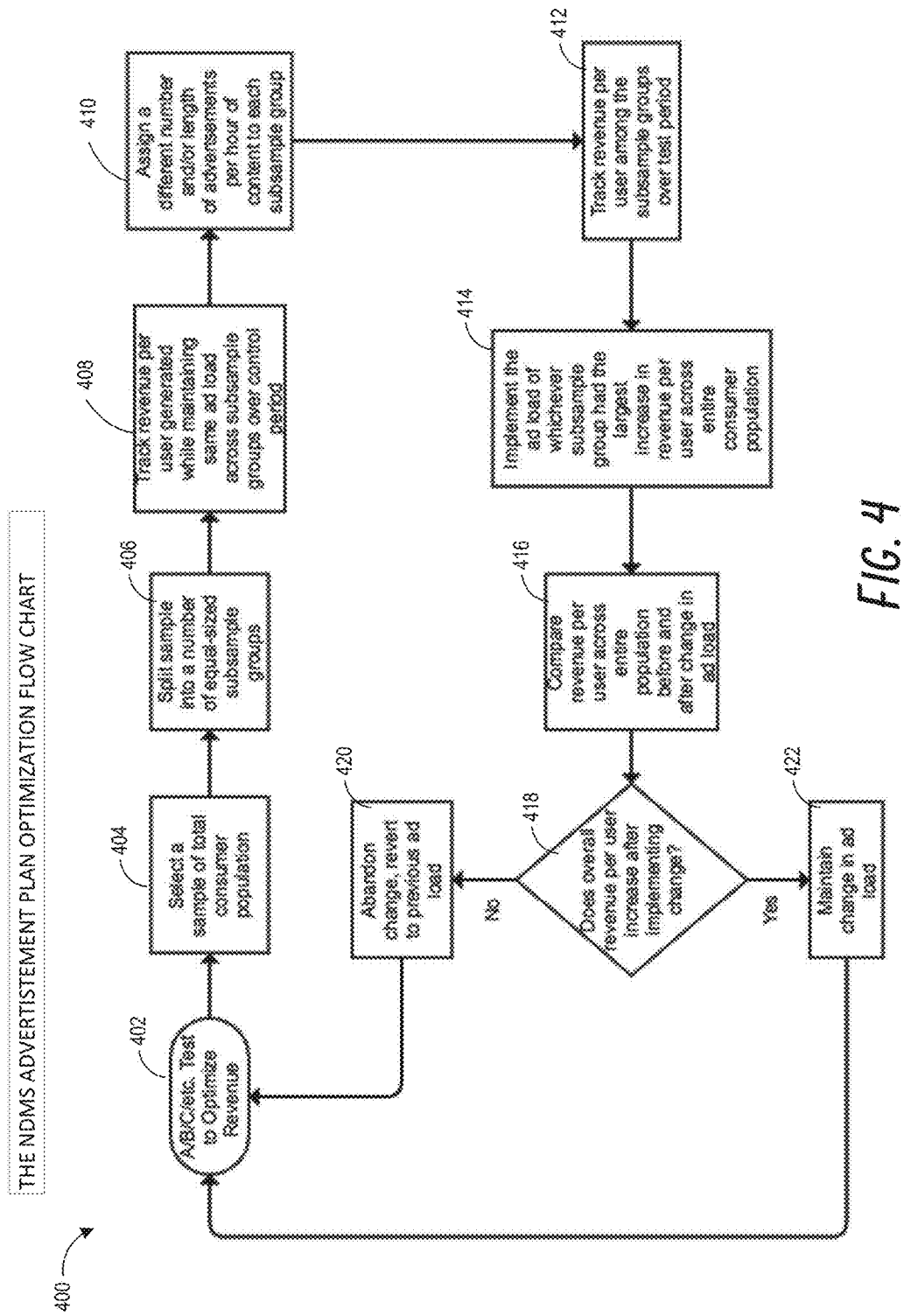
FIG. 4 shows another block diagram for updating nested data items of the database system for dynamic retrieval of nested data items, according to an embodiment.

Now referring to FIG. 4, FIG. 4 shows another block diagram for updating nested data items of the database system for dynamic retrieval of nested data items, according to an embodiment. In some embodiments, one or more of the blocks of FIG. 4 may be optional, and/or blocks may be rearranged.

In some embodiments, the NDMS 106 can update data associated with generating revenue from the consumption of copyrighted works. The NDMS 106 can also advantageously update data associated with said copyrighted works to generate a pool of different advertisement plans. For example, advertisement plans can differ by the number of songs a user can play before an audio advertisement is triggered, or the number of minutes of video a user can watch before an advertisement is triggered. This list is non-exhaustive. This way, the NDMS 106 can automatically process hundreds of thousands (or more) of data items at the same time. Such process is intimately tied to, and enabled by, computer technology At 402, the NDMS 106 can trigger the optimization process upon detecting instructions from a user system 102. The process can also be triggered upon pre-stored instruction in the servers. For example, in some embodiments, pre-stored instructions can be stored in the data repository 108 to run the optimization process every day, every week, bi-weekly, every month, or upon user data reaching a pre-set number. Such user data can be the amount of time all the users have spent accessing content. It can also be the number of users who have joined the system, or the number of advertisements that have been served. This is not an exhaustive list. The NDMS 106 can update data associated with the pre-stored instructions at any time through data input by a user system 102.

At 404, the NDMS 106 can select a sample of total users in the NDMS 106. In some embodiments, the sample can consist of 0.1%-99% of all users in the NDMS 106. In some embodiments, the NDMS 106 can select a sample of certain type of users in the NDMS 106 based on their age, gender, location, interest, activities, browser history associated with the users and so forth. This way, the NDMS 106 can optimize revenue from certain groups of users and advertisements targeting such groups of users.

At 406, the NDMS 106 can split the sample into a number of equal-sized subsample groups. For example, in some embodiments, different subsample groups have (approximately) the same number of users. The subsamples can also have users from the same age range, same gender, same location, same interest(s), and so on. The NDMS 106 can then track revenue generated while maintaining the same advertisement load across subsample groups over a controlled period of time at 408. The control period time can be several hours, a day, several days, a week or more. This is not an exhaustive list. The revenue tracked can be revenue per user. It can also be revenue per subsample.

At 410, The NDMS 106 can adjust ways that advertisements are displayed in each subsample group. In some embodiments, the NDMS 106 can assign a different number of advertisements. The NDMS 106 can also rearrange the sequences of the advertisements in one or more user systems 102. It can also adjust the length of advertisements to be displayed. The NDMS 106 can also change time slots where advertisements are to be displayed in one or more user systems 102.

At 412, the NDMS 106 can track revenue among the subsample groups over the controlled period of time. The tracked revenue can be calculated in the same way as the tracked revenue at 406. The NDMS 106 can then generate new data associated with the new revenue in the data repository 108. The NDMS 106 can compare all the data for such tracked revenue and select an optimized advertisement plan for the sample. The optimized plan can be a plan with highest revenue. It can also be a plan with highest increase of revenue in a certain period of time. At 414, the NDMS 106 can implement the selected plan in all users or a group of users.

The NDMS 106 can then track the revenue generated from the plan at 416. It can compare revenue across the entire population before such implementation and the new revenue after the implementation at 416. The NDMS 106 can then determine whether overall revenue increases after the implementation of the new plan. Such overall revenue can be revenue per group of users. It can also be revenue per user. It can also be revenue from all users and advertisements in the NDMS 106.

In some embodiments, upon determination indicating revenue after the implementation of new advertisement plan does not increase, the NDMS 106 can abandon such plan and can revert to previous advertisement plan at 420. At this point, the NDMS 106 can also choose to run another optimization at 402 by selecting a different sample of users at 404.

In some embodiments, upon determination indicating revenue after the implementation of new advertisement plan increases NDMS 106 can maintain the advertisement plan at 422. The NDMS 106 can maintain such plan until the next optimization process is triggered. The NDMS 106 can also choose to run another optimization process at 402 by selecting a different sample of users at 404.

Figure 5:
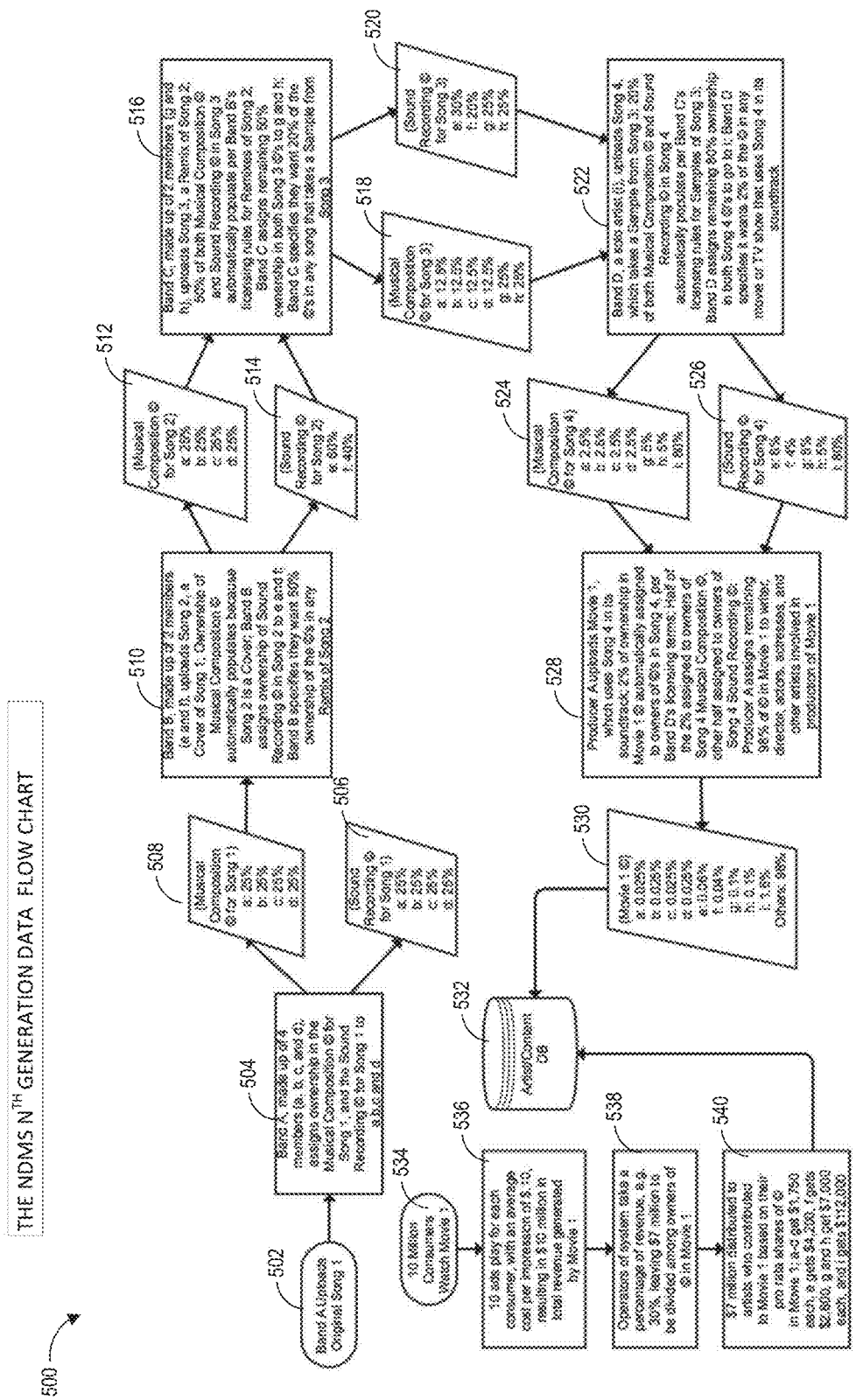
FIG. 5 shows another block diagram for updating nested data items of the database system for dynamic retrieval of nested data items, according to an embodiment.

Now referring to FIG. 5, FIG. 5 shows another block diagram for updating nested data items of the database system for dynamic retrieval of nested data items, according to an embodiment. In some embodiments, one or more of the blocks of FIG. 5 may be optional, and/or blocks may be rearranged.

In some embodiments, the NDMS 106 can generate $n^{th}$ generation data items. The $n^{th}$ generation data items can be associated with derivative copyrightable works. They can also be derivative work revenue shares for different rightsholders. FIG. 5 illustrates how the NDMS 106 generates the $n^{th}$ generation data items representing ownership shares of different rightsholders with respect to copyrighted works.

Artists can use works from different artistic mediums (e.g., songs, music videos, movies and TV shows) and then incorporate them into new works. For example, a song can be covered, remixed, sampled, or mashed up with other songs. This list is non-exhaustive. A song can also be synchronized with video content, as when a movie uses a song in its soundtrack. Furthermore, songs can be comprised of 2 distinct copyrightable works, a musical composition and a sound recording. When a cover song is made, only the original musical composition right is invoked. Meanwhile, the creator of the underlying concept for a movie or TV show can have so-called separated rights granting the creator an interest in subsequent remakes or sequels of the original work. The NDMS 106 can map what roles and shares from an original work (or pair of works in the event of a song, or where the Separated Rights in a piece of video work are invoked), are to be attributed to which roles and shares in the derivative work(s).

The NDMS 106 can store the mapping in the form of a database table and an example of such a table is provided in table b. One example of the pseudo-code for appending the rightsholders of the original work to the list of rightsholders of the derivative work can be viewed below:

```
#def ContentId
#def RighstHolderList[rightsholder, flatfee, percentage]
Get all rightholders with flatfee and percentage from contentrole table for
ContentId and append to RighstHolderList
#def CurrentContentId
CurrentContentId = ContentId;
For each (ReusedContentId in contentcopyright table for CurrentConten-
tId)
    #def FlatFee
    #def PercentageOfRoyalty
    FlatFee, PercentageOfRoyalty = Select flatfee, PercentageOfRoyalty
from contentcopyright table where contentid = CurrentContentId and
copyrightofcontentid = ReusedContentId
    If (FlatFee GREATER THAN 0) then
        For each (CopyrightableContent of the ReusedContentId)
            For each(Artist With Share from contentrole table)
                Weight = Get weight of CopyrightableContent from Table a
    AmountToBePaidToArtist = Weight * ShareOfArtist * Flatfee
            Append Artist and AmountToBePaidToArtist to
CopyrightableContents from Table b, column "Where it gets carried over"
for the derivative content and store it in RighstHolderList;
        End For
    End For
End IF
If (PercentageOfRoyalty GREATER THAN 0) then
    For each (CopyrightableContent of the ReusedContentId)
        For each(Artist With Share from contentrole table)
            Weight = Get weight of CopyrightableContent from Table a
            If(CopyrightableContent between original and derivative content
matches)
                PercentageTobeOwnedByArtist =
ShareOfArtist*PercentageOfRoyalty
            Else
                PercentageTobeOwnedByArtist =
Weight*ShareOfArtist*PercentageOfRoyalty
            Append Artist and PercentageTobeOwnedByArtist to
CopyrightableContents from Table b, column "Where it gets carried over"
for the derivative content and store it in RighstHolderList;
        End For
    End For
End IF
CurrentContentId = ReusedContentId
End For
```

TABLE a

Table showing copyrightable works and their corresponding weights. This list is not exhaustive and the weights are configurable

| Type of Art | Copyrightable Content | Weight |
|---|---|---|
| Album | MusicalComposition | 50% |
| Album | SoundRecording | 50% |
| Single | MusicalComposition | 50% |
| Single | SoundRecording | 50% |
| MusicVideo | MusicalComposition | 30% |
| MusicVideo | SoundRecording | 30% |
| MusicVideo | VideoRights | 40% |
| TVShow | EpisodeRights | 100% |
| TVShow | StoryRights | 0% |
| Movie | MovieRights | 100% |
| Movie | StoryRights | 0% |

TABLE b

Mapping table for various copyrightable works. This list is not exhaustive and the mappings are configurable

| Type of Derivative Work | Reuse Type | Original Work | What gets carried over | Where it gets carried over |
|---|---|---|---|---|
| Song | Cover | Song | MusicalComposition | MusicalComposition |
| Song | Sample | Song | MusicalComposition | MusicalComposition |
| Song | Sample | Song | SoundRecording | SoundRecording |
| Song | Mashup | Song | MusicalComposition | MusicalComposition |
| Song | Mashup | Song | SoundRecording | SoundRecording |
| Song | Remix | Song | MusicalComposition | MusicalComposition |
| Song | Remix | Song | SoundRecording | SoundRecording |
| Song | Audio Sample | Movie/TV Show | MovieRights/ EpisodeRights | SoundRecording |
| MusicVideo | ShortClip | Movie/TV Show/Music Video | MovieRights/ EpisodeRights/ MusicVideoRights | MusicVideoRights |
| MusicVideo | MusicVideo | Song | SoundRecording | SoundRecording |
| MusicVideo | MusicVideo | Song | MusicalComposition | MusicalComposition |
| TVShow | AudioSample | Movie/TV Show/Music Video | MovieRights/ EpisodeRights/ MusicVideoRights | EpisodeRights |
| TVShow | ShortClip | Movie/TV Show/Music Video | MovieRights/ EpisodeRights/ MusicVideoRights | EpisodeRights |
| TVShow | LongClip | Movie/TV Show/Music Video | MovieRights/ EpisodeRights/ MusicVideoRights | EpisodeRights |
| TVShow | Soundtrack | Song | MusicalComposition * $W_{MC}$ + SoundRecording * $W_{SR}$ | EpisodeRights |
| TVShow | Remake | Movie/TV Show | StoryRights | EpisodeRights |
| TVShow | Sequel | Movie/TV Show | StoryRights | EpisodeRights |
| Movie | AudioSample | Movie/TV Show/Music Video | MovieRights/ EpisodeRights/ MusicVideoRights | MovieRights |
| Movie | ShortClip | Movie/TV Show/Music Video | MovieRights/ EpisodeRights/ MusicVideoRights | MovieRights |
| Movie | LongClip | Movie/TV Show/Music Video | MovieRights/ EpisodeRights/ MusicVideoRights | MovieRights |
| Movie | Soundtrack | Song | MusicalComposition * $W_{MC}$ + SoundRecording * $W_{SR}$ | MovieRights |
| Movie | Remake | Movie/TV Show | StoryRights | MovieRights |
| Movie | Sequel | Movie/TV Show | StoryRights | MovieRights |

In some embodiments, to append the list of rightsholders into the correct copyrightable works, a user makes a request to the web/application server with the list of works reused and the type of reuse through a user system 102. The web/application server can then retrieve the corresponding records of rightsholders for each reused work. In some embodiments, upon request from a user system 102, the web/application server can retrieve the corresponding records of rightsholders for each reused work. Based on the given derivative work type and reuse type, the NDMS 106 can query the mapping table to retrieve the type(s) of copyrighted works that it will need to get rightsholders for from the column "What gets carried over." The NDMS 106 can then retrieve the list of rightsholders from the content-copyright table 2066 who have a share in any of the types of copyrighted works. The NDMS 106 can then append the list of rightsholders from the original work(s) to the list of rightsholders in the derivative copyrighted work(s) specified in the column "Where it gets carried over." Note that for some reuse types, there can be only one set of rights to carry over (e.g. for cover songs, the NDMS 106 only has to carry over the musical composition rightsholders), while for other reuse types there can be two sets of rights to carry over (e.g. for a remix, the NDMS 106 has to carry over the rightsholders for both the musical composition and the sound recording) and for some reuse types, multiple sets of rights may get carried over to a single set of rights in the derivative work (e.g. when a song is used in a movie as a soundtrack, the NDMS 106 can carry over both the sound recording and musical composition rightsholders from the song and append it to the one list of rightsholders in the movie rights for the movie). When the number of copyrighted works to be carried over is greater than the copyrighted works it will get appended to, the NDMS 106 can divide each rightsholders' shares of revenue by the corresponding weight mentioned in Table a.

In some embodiments, for each derivative work, the NDMS 106 can loop through the copyrighted works. Each copyrighted work can have a weight associated with it in such a way that the total of the weights add up to 100. Basically, these weights can be amounts that define what percentage of the revenue is to be allocated to each of the copyrighted works that collectively make up a piece of content. For example, the NDMS 106 can determine that the musical composition of a song has a weight of 50% and the sound recording has a weight of 50%. The NDMS 106 can denote these weights as W. The NDMS 106 can repeat this process on each original work that the derivative copyrighted content reuses. Within each copyrightable work, there may be rightsholders to whom a percentage of revenue is owed. This amount can be denoted as S. The NDMS 106 can denote the flat fee and percentage of the revenue from other work reusing this specific copyrightable work as F and P respectively. The flat fee and percentage of royalty for one rightsholder can be calculated as following:

Flat Fee=$W/100*S*F$

Percentage Of Royalty=$S*P$

The NDMS 106 can append the rightsholders of the original work to the list of rightsholders of the derivative work. For example, if a rightsholder owns one share of the original musical composition, the NDMS 106 can append his share into the musical composition copyright of the derivative work according to the Percentage of Royalty formula. However, if the copyrightable works are different (for example, when a song is used in a movie), then the percentage of royalty attributed to the overall song may be multiplied by the weight W % before the rightsholders of both the musical composition and the sound recording comprising the song are appended to the list of rightsholders in the movie. There can also be a database table that determines what derivative works the rightsholders may get appended to based on the nature of the original work, the derivative work, and the reuse type.

At 502, in some embodiments, an artist can upload an original copyrighted work. For example, Band A can upload an original song, Song 1. The NDMS 106 can update data about Song 1 in the artist/content database regarding ownership shares in different copyrightable components of the copyrighted work at 504. In some embodiments, this can be done by a user's input. For example, a user can select the genres that best describe the work. This selection can be done via an autocomplete list that suggests potential genres as the user starts typing. The user may also be able to add new genres to the genre database table. There may be a minimum number of genres that an artist must select before he or she can proceed to the next step, enforced by a minimum number validation in the HTML or native application code. Ensuring that artists select multiple genres can help users discover their work. In some embodiments, the NDMS 106 can determine the genre of the copyrightable work being uploaded. For example, if an artist uploads a song in a file, the NDMS 106 can break the file into small pieces of data. It can then determine the type or genre of the copyrightable work based on information associated with the data. Upon the artist inputting data about the type or genre of the copyrightable work or the NDMS 106 determination of the type of the copyrightable work, the NMDS 106 can create certain data items associated with the specific type of the work. For example, if the copyrightable work being uploaded is a song, the NDMS 106 can create data items associated with, including but not limited to: rightsholders' ownership of musical composition and rightsholders' ownership of sound recording. In another example, if the copyrightable work being uploaded is a video, the NDMS 106 can create data items associated with, including but not limited to: rightsholders' ownership of the audio component of the video; rightsholders' ownership of the visual component of the video.

The NDMS 106 can then update data, for the present example, indicating Band A is made up of 4 members (a, b, c, and d) upon user's update; the NDMS 106 can also update data indicating rightsholders' ownership of the musical composition as well as of the sound recording of Song 1. The NDMS 106 can store data regarding different components of such copyrightable work in the data repository 108. For example, the NDMS 106 can store musical composition ownership at one data item at 508. The NDMS 106 can store sound recording ownership in another data item at 506. In this example, each of the band members has 25% ownership of the musical composition and sound recording copyrights. The NDMS 106 can generate multiple data items for various types of ownerships.

At 510, the NDMS 106 can generate one or more $2^{nd}$ generation data items. For example, Band B, made up of 2 members, e and f, uploads Song 2, a cover song and a derivative work of Song 1. The NDMS 106 can generate $2^{nd}$ generation data items associated with Song 2 upon Band B's input. Such input can be the type of the copyrightable work and type of reuse. In some embodiments, the NDMS 106 can determine the type of the genre and/or the type of reuse through the process described above. At 512, the NDMS 106 stores data corresponding to the share of the copyright in the musical composition of Song 2 that each rightsholder owns. Because Song 2 is a cover of Song 1 i.e., Band B has used the original musical composition, the data item can show that the musical composition ownerships belongs to a, b, c, and d, exactly as in Song 1's musical composition data item, 508. Another data item at 514 can indicate sound recording ownership of Song 2 belongs to e and f Another data item can indicate Song 2 is a derivative work of Song 1. In some embodiments, the NDMS 106 can also compare new works with existing copyrightable works in the data repository 108. In some embodiments, artists can input original works they reused in user systems 102. Upon receiving such input, the NDMS 106 can update data in the data repository 108.

In some embodiments, Band A can specify licensing terms of what they want to have in every derivative work that reuses Song 1 at 504 in a user system 102. Such licensing terms can be percentage of ownership in the derivative work. They can also be a flat fee for each use of the original work. They can also be other terms made by original copyrightable work owners, such as limiting the use of the work. For example, they can specify that they intend to own 50% ownership of every derivative work that uses Song 1. At 510, the NDMS 106 can transmit Band A's licensing terms to a user system 102. Band B can view such terms on its user device. Band B can have the opportunity to accept proposed licensing terms. They can also negotiate with Band A through the NDMS 106 to reach new licensing terms. Such licensing terms can be percentage of ownership in the derivative work. They can also be a flat fee for reuse of the original work. They can also be any other terms agreed by both parties. The NDMS 106 can then update data associated with the agreed licensing terms.

In some embodiments, the NDMS 106 can create as many data items as needed for new derivative works in the data repository 108 to store different information. For example, Movie 1 at 528 can use Song 4 uploaded by Band D at 522 in its soundtrack while Song 4 is a derivative work of Song 3 uploaded by Band Cat 516 and Song 3 is a derivative work of Song 2. In one example, a movie at 528 can also be a derivative work that combines Song 2, Song 3, Song 4 and other copyrightable works in the NDMS 106. The NDMS 106 can generate data items storing every piece of information. The NDMS can create data items indicating that Movie 1 is the derivative work of Song 1, Song 2, Song 3, Song 4 and the other copyrightable works. This way, the NDMS 106 can generate the $n^{th}$ generation data items containing information of all the works a derivative work is based on. Such features and others are intimately tied to, and enabled by, computer technology, and would not exist except for computer technology.

At 532, the NDMS 106 can update all the data regarding copyrightable works in the artist/content database. The NDMS can use the data to provide the copyrightable works to users. The NDMS 106 can use such data to make new advertisement plans. It can also use such data to determine revenue to be distributed to each rightsholder associated with the copyrightable work. For example, at 534, 10 million non-subscription users watched Movie 1. 10 advertisements were played for each user, with an average cost per impression of $0.10, resulting in $10 million in total revenue generated by Movie 1. The operator of the NDMS 106 can take a percentage of such revenue. For example, system managers can take 30% of the revenue, leaving $7 million to be divided among owners of copyright in Movie 1 at 538. The NDMS 106 can then determine each owner's revenue based on the $n^{th}$ generation data items reflecting ownership shares in Movie 1. The NDMS 106 can then distribute the revenue based on the data associated with the derivative work.

Now referring to FIG. 6A-6C, FIG. 6A-6C show user interfaces of the database system for dynamic retrieval of nested data items, according to an embodiment. Such user can be a consumer, an artist or an advertiser. A user can sign up by clicking or tapping buttons 602, 604 or 606 to select his or her category on a user device. The NDMS 106 can then ask the user to update first name in text box 608, last name in text box 610, email address in text box 612, password in text box 616. A user can click or tap "sign up" button 618 to continue. Users can type their information into a graphical user interface which may contain HTML input elements. In some embodiments, a user can sign up with other social media network accounts at 620, for example, but not limited to Facebook, Google LinkedIn, Instagram, Snapchat, WhatsApp, Twitter, and etc. Such user can then continue to step 1 in text box 632 where the user can update information about gender in text box 636, age in text box 638, location in text box 640 and zip code in text box 642. The user can then continue to step 2 at 634 where the user can update information regarding interest in text box 652, music interest in text box 652, movie & TV shows interest in text box 654. A user can return to step 1 by either clicking on button 656 or 632. Users can make updates via "sliders", text boxes, "auto-complete lists", "maps" and/or other UI elements.

Location information 640 can also be extracted by using "Location Services" on the client device based on a GPS and/or wireless network. The NDMS 106 can validate such information upon receiving a Hyper Text Transfer Protocol (HTTP) request from the user system 102. The web/application server can then parse the entered information and forward it to the database server. The database server can store this information in the user table 2128 and make the data durable by writing it on a hard drive. This can ensure that the information exists even after a power failure. The NDMS 106 can encrypt the password entered by the user before it is stored in the database.

After all the information has been filled up, the user can create a new profile by clicking or tapping 658. The NDMS 106 can then create data for the new user. In some embodiments, the NDMS 106 can send a notification to new user's email ask for verification. In this case, the NDMS 106 cannot update new user data until verification process has been completed by the user.

For an existing user, the user can log into the NDMS 106 by clicking on or tapping button 616 in the device. The NDMS 106 can ask such user to fill in relevant user information. The NDMS 106 can then match user information entered by the user with the data in the consumer/user database. It can then allow the user to move forward to access work in the NDMS 106. Such user information can be the email address and password combination. The email address and password combination must exactly match the information entered during the signup process.

In some embodiments, the NDMS 106 can use user information provided at signup (and collected periodically as users interact with the service) to target both content and advertisements to users. Targeting content can benefit users because users can discover new songs and videos that they enjoy listening to and watching. Targeting advertisements can potentially benefit users in at least two ways: targeted advertisements may contain coupons and discounts for products and services the targeted users are more likely to redeem, and as the line between content and advertisement blurs, the targeted users can be more likely to enjoy watching targeted advertisements. Moreover, the targeted advertisements can benefit advertisers because the NDMS 106 is only showing the targeted advertisements to users who are likely to consume the products and services. Thus the advertisers can be willing to pay more per impression. In some embodiments, this means more money going to artists per advertisement, which allows fewer advertisements to be played, which keeps users more engaged. The ability to continually and automatically refine the balance between the number and length of advertisements played per hour of content consumption as described herein can be advantageous in some embodiments. Based on user engagement metrics, such as average length of time spent consuming work per session and number of sessions per month, as well as revenue metrics, the NDMS 106 can increase or decrease the advertisement load in order to maximize the amount of money generated for artists. (See FIG. 4) Such features and others are intimately tied to, and enabled by, computer technology, and would not exist except for computer technology.

Figure 7:
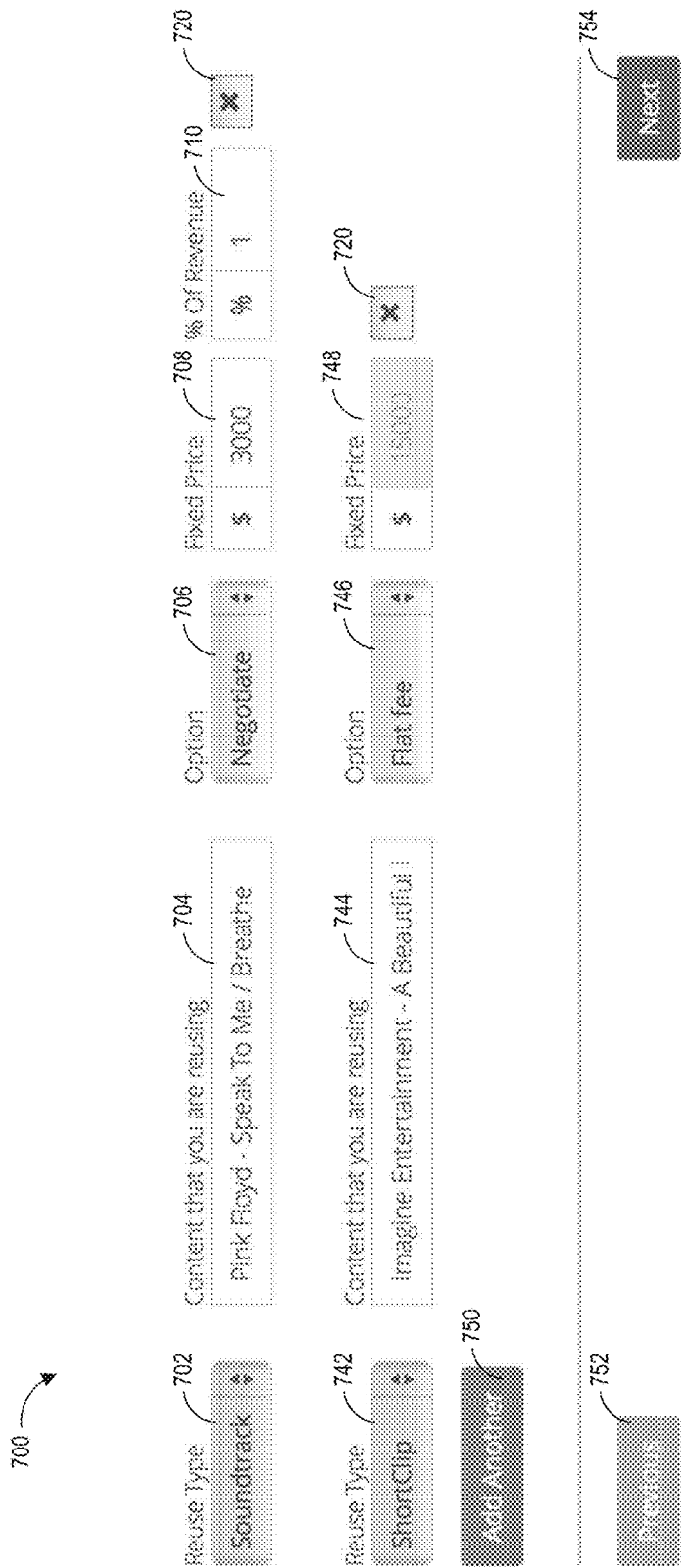
FIG. 7 shows another user interface for updating nested data items of the database system for dynamic retrieval of nested data items, according to an embodiment.

FIG. 7 shows another user interface for updating nested data items of the database system for dynamic retrieval of nested data items, according to an embodiment. In some embodiments, the NDMS 106 can determine ownership of a derivative work by updating data input by users. FIG. 7 illustrates a user interface for inputting such data. A derivative artist can specify the type of reuse of the copyrightable work at dropdown 702 and dropdown 742. Dropdown 702 or 742 can show the different types of reuse acceptable for the type of work being uploaded. For example, songs can incorporate other songs but no video clips while video clips can incorporate both songs and/or other video clips. The NDMS 106 can populate the dropdowns by a user system 102 making a HTTP GET request to the web/application server. The web/application server can then query the artist/ content database for such information. The NDMS 106 can get the list of possible reuse types from the contentrightstype table 2070.

In some embodiments, once a user selects a value in the reuse type at dropdown 702 or 742, the NDMS 106 can present the user with a textbox field 704 or 744. The user can input the name of the work that the uploading work reuses. Once the user starts typing, the user system 102 can make a HTTP GET request to the web/application server and the web/application server can retrieve the possible results for that query based on the search term and as well as the selected reuse type. The NDMS 106 can retrieve this result from the content table 2014.

Once the user selects an item from the result set, the user can then select an option at dropdown 706 or 746 for paying royalties to the rightsholders of the selected work. For example, the options can be "negotiate", "flat fee", "percentage", or "combo—flat fee & percentage". Once the option is selected, the user system 102 can make another HTTP GET request to the web/application server. The web/application server can then query the contentrights table 2068 to get the terms of reuse for the given reuse type, the "contentid" of the work selected and the royalty payment option selected. The NDMS 106 can then show the terms of reuse to the user in a visual element like textbox 708, 710, or 748. The user can perform this process a number of times until all of the reused works are updated. To add another reused work of art, the user can click or tap "Add Another" button 750 which can create additional input elements on the screen to begin the process anew for the additional piece of reused work, starting with the reuse type dropdown. In some embodiments, the NDMS 106 can ensure that the terms of reuse are read-only, i.e. they cannot be edited by the user. However, in the example where the user would like to negotiate the terms in which case, the user can select "negotiate" as the option and the NDMS 106 can make the terms editable. The NDMS 106 can store the complete list of reused works along with the terms selected and reuse type in the contentcopyright table 2066.

In some embodiments, the NDMS 106 can also determine whether the copyrightable work being uploaded is a derivative work by comparing the data being uploaded with data in the artist/content database. In some embodiments, upon receiving new work from a user system 102, the NDMS 106 breaks the work into pieces of different sizes. It can then compare data in the artist/content database with the pieces. For example, if an artist uploads a song, upon receiving the song, the NDMS 106 breaks the song into different short sections and generates new data associated with the sections. The NDMS 106 can then search the entire databases to match new data with the data in the data repository 108. If the NDMS 106 determines that there are sufficient similarities between the new data and the data in the data repository 108, it can notify the artist that the uploaded content is a derivative work. The NDMS 106 can then display to the artist all the pre-existing copyrighted work that the newly uploaded work reuses.

FIG. 8 shows another user interface for listing updated nested data items of the database system for dynamic retrieval of nested data items, according to an embodiment. FIG. 8 illustrates a revenue list for an artist's revenue from all original and derivative works in which the artist owns a share of the copyright to be displayed on the artist's device. The NDMS 106 can transmit data associated with the names of all original and derivative copyrighted works in the system for which a given artist owns a share to a user system 102. The artist can view the names of the works on the artist's device in column 804. The NDMS 106 can transmit data associated with the types of each copyrighted work to a user system 102. The artist can view the types of each copyrighted work on the artist's device in column 806. The NDMS 106 can transmit data associated with the date each copyrighted work was uploaded to a user system 102. The artist can view the date each copyrighted work was uploaded on the artist's device in column 808. The NDMS 106 can transmit data associated with the total budget of each copyrighted work to a user system 102. The artist can view the total budget of each copyrighted work on the artist's device in column 810. The NDMS 106 can transmit data associated with the total money paid from the budget of the project to the artists and rightsholders involved in making the copyrighted work to a user system 102. The artist can view the total money paid on the artist's device in column 812. The NDMS 106 can transmit data associated with the number of times each copyrighted work has been played to a user system 102. The artist can view the number of times on the artist's device in column 816. The NDMS 106 can transmit data associated with the number of users liking or favoriting each copyrighted work to a user system 102. The artist can view such number on the artist's device in column 818. The NDMS 106 can transmit data associated with the revenue attributed to the exploitation of each copyrighted work to a user system 102. The artist can view such revenue on the artist's device in column 820. The NDMS 106 can transmit data reflecting an individual artist's share of the revenue attributed to an original or derivative copyrighted work. The artist can view such share on the artist's device in column 822.

Figure 9:
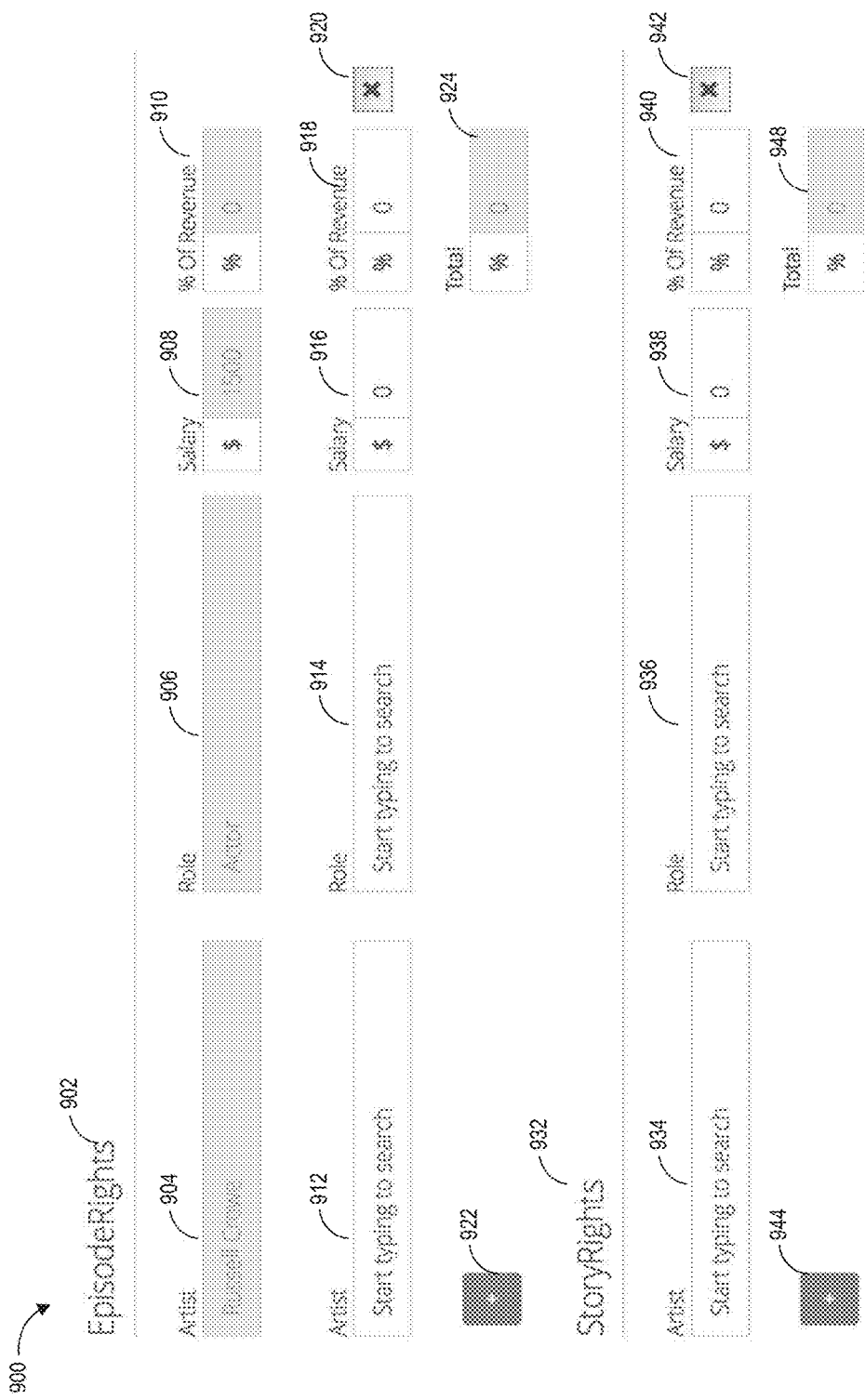
FIG. 9 shows another user interface for updating nested data items of the database system for dynamic retrieval of nested data items, according to an embodiment.

FIG. 9 shows another user interface for updating nested data items of the database system for dynamic retrieval of nested data items, according to an embodiment. FIG. 9 illustrates a user interface for an artist or a group of artists to update ownership of each rightsholder for a specific copyrightable work. Any time an artist uploads a new copyrightable work to the NDMS 106 through a user system 102, the user system 102 can present the artist interface elements like textboxes for users to input rightsholders who contributed to the creation of the new work, including their names 912, roles 914, the salaries they have been or will be paid in exchange for their contribution to the creation of the new work 916, and the percentage ownership in the copyright of the new work that they receive in exchange for their contribution to the creation of the new work 918. The artist can input all this information into the user system 102.

For example, in a TV episode, an artist group can input episode rights in section 902. An administrator can input in text boxes 912 with names, 914 with roles in the episode, 916 with salaries for each rightsholder, and 918 with percentage of revenue. The administrator can add more artists or rightsholders by clicking or tapping a button 922. The administrator can delete existing artists by clicking or tapping a button 920. The NDMS 106 can then automatically calculate total percentage of revenue to be shared between artists in text box 924. The NDMS 106, after the administrator updates all the information, can store all the data in the data repository 108.

Similarly, an administrator can input storyrights ownerships with the name in text box 934, role in text box 936, salary in text box 938, and percentage of revenue in text box 940. A user can add more owners by clicking a button 944. Such storyrights can include, but are not limited to, the rights to make and sell sequels, remakes, and merchandise based on the overall concept and characters from a movie or television show. The administrator can delete existing owners by clicking a button 942. The NDMS 106 can then calculate total percentage of revenue to be shared between rightsholders in text box 948. The administrator can make these updates via "sliders", text boxes, "auto-complete lists", "maps" and/or other UI elements. These user interface elements may be read-only, to reflect that the rightsholders in the new derivative work have already agreed to the terms specified by the rightsholders in the pre-existing original work (or they have already negotiated an ad hoc deal) and these terms cannot be edited at this point. Once the list of rightsholders have been inputted, the user 102 can then make a HTTP request and pass data to the web/application server. The NDMS can store such data in the contentrole table 2064.

FIG. 10 shows another user interface for updating nested data items of a database system for dynamic retrieval of nested data items, according to an embodiment. FIG. 10 illustrates a user interface where the owners of the copyright in a movie can specify licensing terms for reusing their copyrightable work. Any time an artist uploads a new copyrightable work to the NDMS 106 through a user system 102, the user system 102 can present the artist interface elements like textboxes for users to input the terms of reuse for the work. The system displays the possible types of reuse based on the work of art being uploaded at 1008. For example, if the uploader is uploading a song, the possible types or reuse can be "Remix", "Cover", "Mashup", etc. For a movie or TV show, the possible types of reuse can be "AudioSample", "ShortClip", "LongClip", "Remake", or "Sequel" as shown at 1008. These lists are non-exhaustive. For each type of reuse the uploader can enter a flatfee 1010, percentage 1012 and/or a combination of both flat fee 1014 and percentage 1016. In some embodiments, the data values representing reuse terms can be determined by an algorithm configured to optimize the amount of revenue generated by exploitation of derivative works. Once the user has entered the terms of reuse for the different types or a revenue maximization algorithm has determined these terms, the user system 102 then sends this information by a HTTP request to the web server. This NDMS 106 then stores this data in the contentrights table 2068. Artists can begin this process anew for each work of art they are uploading.

Figure 11:
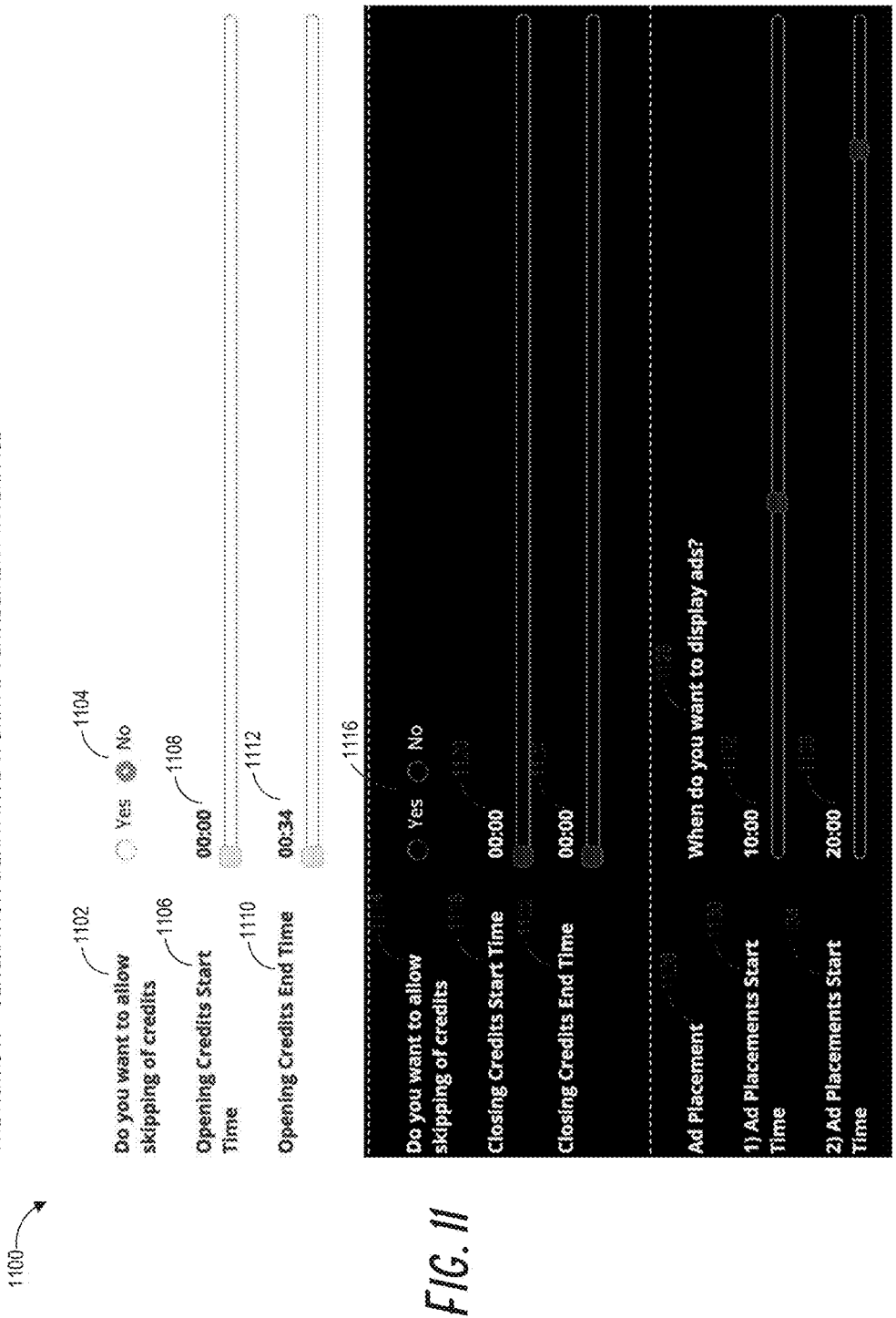
FIG. 11 shows another user interface for updating nested data items of the database system for dynamic retrieval of nested data items, according to an embodiment.

FIG. 11 shows another user interface for updating nested data items of the database system for dynamic retrieval of nested data items, according to an embodiment. FIG. 11 illustrates an artist interface for the artist to configure the display of credits and advertisements during display of his or her copyrighted works. The NDMS 106 can ask whether an artist of a TV show wants to allow users to skip artist credits. An artist can update that information in 1104. In 1106, 1108, 1110 and 1112, an artist can input opening credits start time and end time. In 1126, an artist can input a specified period of time to place an advertisement during display of his or her copyrighted work. An artist can input a time of display of a first advertisement break at 1130 and 1132 and a time of display of a second advertisement break at 1134 and 1136. Upon an artist's input, the NDMS 106 can update data in the data repository 108.

Figure 12:
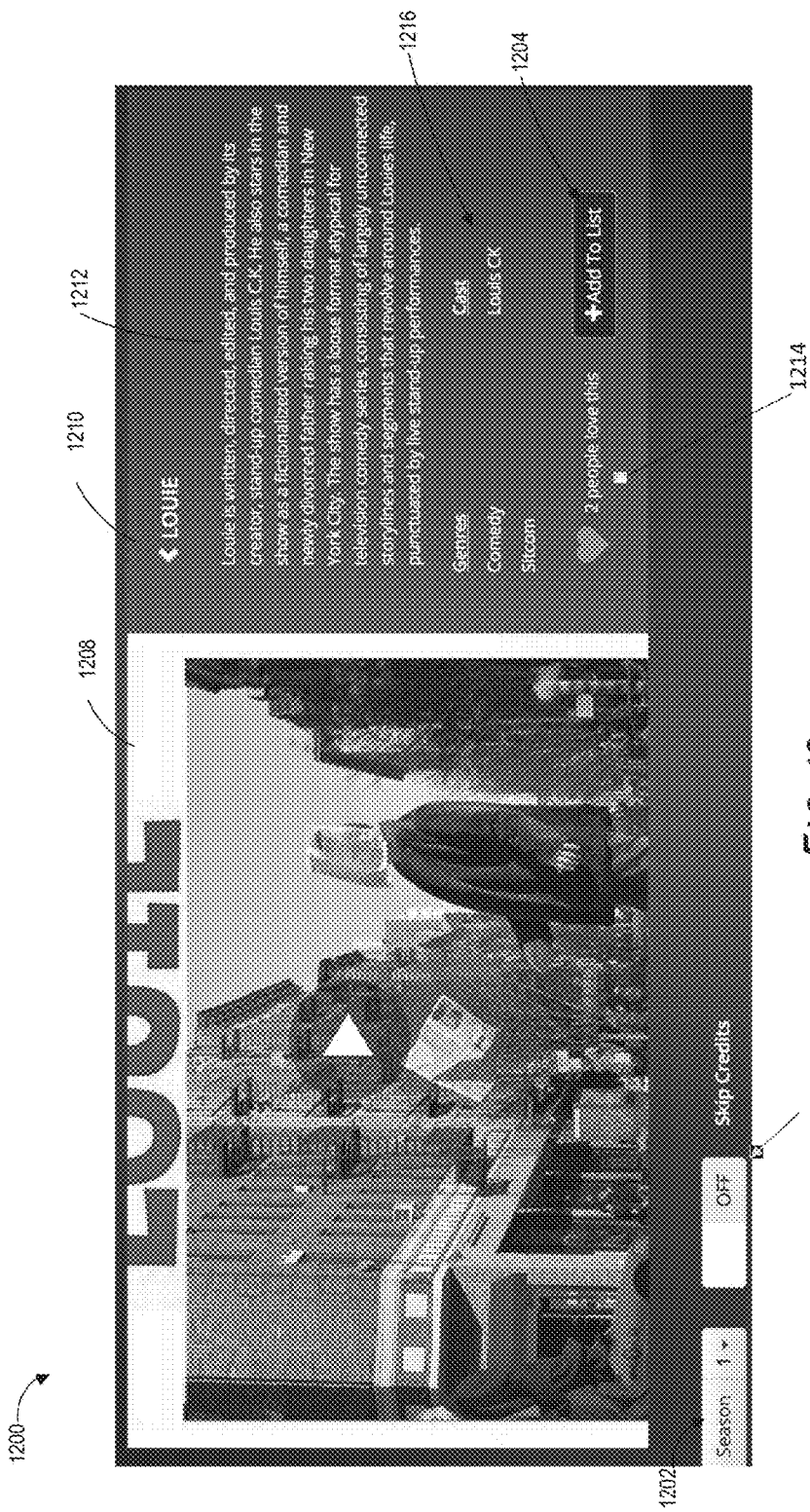
FIG. 12 shows another user interface for viewing nested data items of the database system for dynamic retrieval of nested data items, according to an embodiment.

FIG. 12 shows another user interface for viewing nested data items of a database system for dynamic retrieval of nested data items, according to an embodiment. In some embodiments, FIG. 12 illustrates how a TV series can be displayed on a user's device. At dropdown 1202, a user can choose which season of the TV series to view. At slider 1206, upon artist allowing skipping credits in 1104, a user can choose to skip or display credits. The NDMS 106 can transmit data associated with the TV series to one or more user systems 102. A user can see a preview or poster of such TV series in 1208. The user can also see the title of the TV in text box 1210. The user can also see the description of such TV series in text box 1212. The user can also see the number of users who liked the TV series in text box 1214. The user can also like such TV series by clicking or tapping the "heart" button. The user can also see the cast and genres of such TV series in text box 1216. The user can also add TV show to his or her list by pressing a button 1204. These inputs can be made via "sliders", text boxes, "auto-complete lists", "maps" and/or other UI elements. Upon a user's input, the NDMS 106 can update data in the data repository 108.

Figure 13:
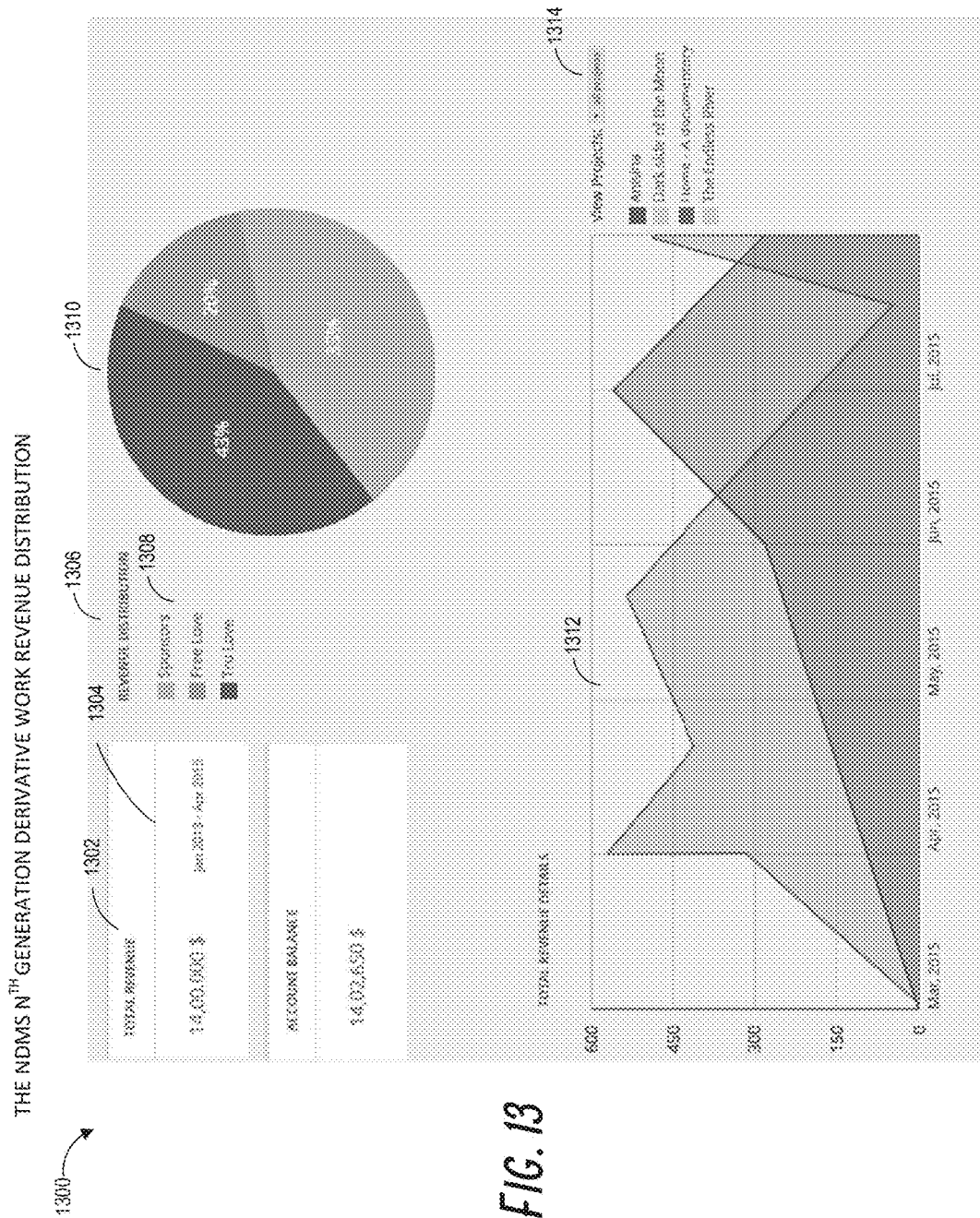
FIG. 13 shows another user interface for listing updated nested data items of the database system for dynamic retrieval of nested data items, according to an embodiment.

FIG. 13 shows another user interface for listing updated nested data items of the database system for dynamic retrieval of nested data items, according to an embodiment. FIG. 13 illustrates a revenue distribution interface for an artist. The NDMS 106 can transmit data associated with revenue distribution to one or more user systems 102. Artists can access on their devices a set of dashboards that display regularly updated information: the number of times their songs, videos, and other media are consumed, the ages, genders and locations of the fans consuming their work, the proportion of their fans who have free versus paid subscriptions 1308, the brands that are spending the most to advertise their products and the services alongside the artists' work, and the revenue being generated by their work in text box 1302. The NDMS 106 can transmit such data on a more granular basis with respect to individual works and pieces of work, e.g. albums and songs. The user systems 102 can display such data in multiple formats, including textual/numerical, e.g., spreadsheets, tables, and visual formats, e.g., graphs, maps.

In some embodiments, the user system 102 can make a network request to the web/application server and the web/application server subsequently contacts the database server with the request. The database server can run a query (such as a SQL stored procedure), which can compute the required analytics, based on the request. The query can aggregate these values for the selected period of time. Once the computation is complete, the information can be forwarded to the user system 102, which then renders this information in a combination of spreadsheets and other graphical data representations such as pie charts and line charts. These user interface elements can be made intuitive such that, the artist can easily comprehend his revenue across dates, and/or within his various works of art by interacting with the application.

Figure 14:
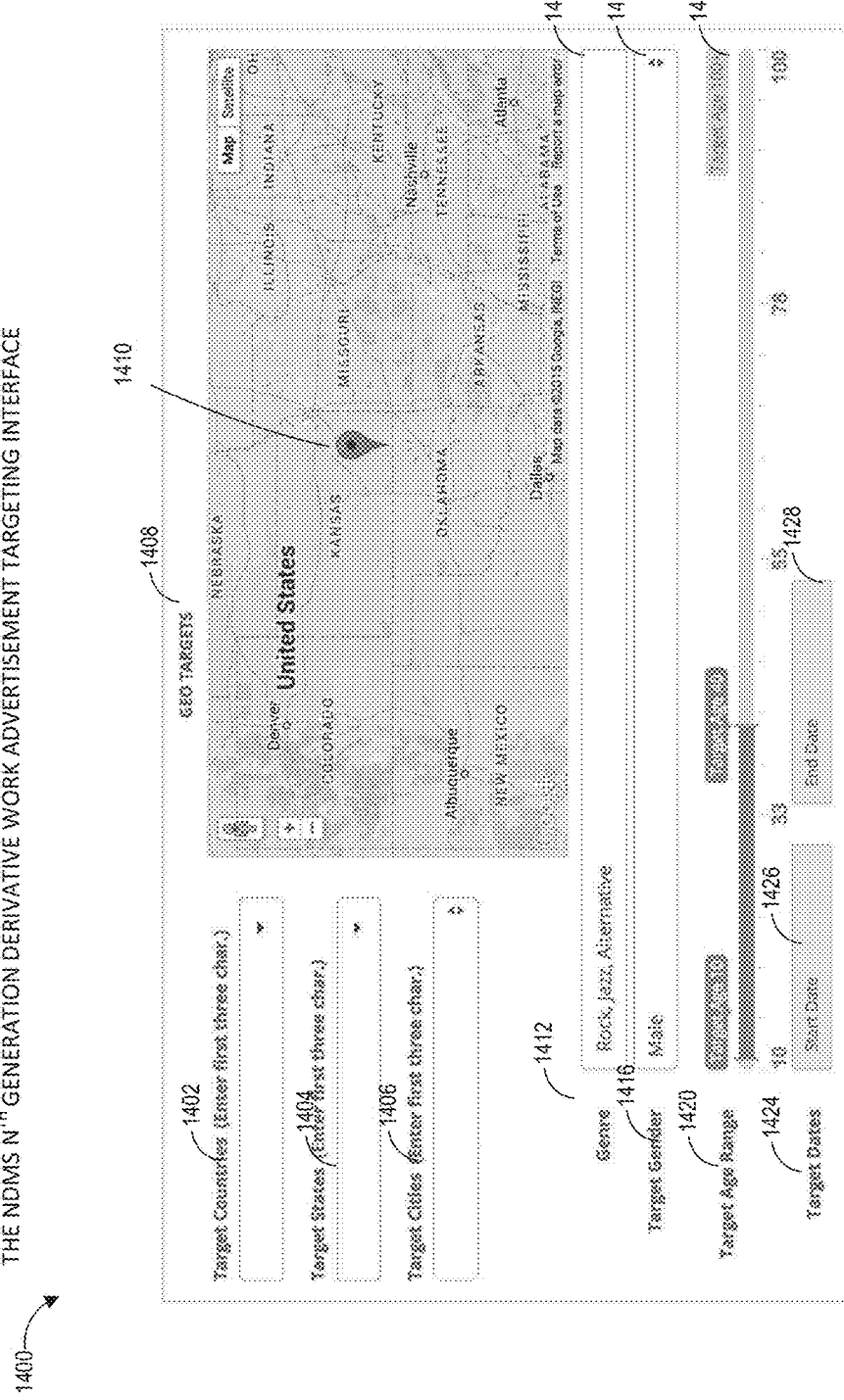
FIG. 14 shows another user interface for updating nested data items of the database system for dynamic retrieval of nested data items, according to an embodiment.

FIG. 14 shows another user interface for updating nested data items of the database system for dynamic retrieval of nested data items, according to an embodiment. FIG. 14 illustrates an advertiser interface for advertisements placement. An advertiser can choose targeted countries at a dropdown 1402, targeted states at a dropdown 1040, and targeted cities at a dropdown 1404. The NDMS 106 can show a map for such geographic targeting at 1408 and 1410. At textboxes 1412 and 1414, the NDMS 106 can ask an advertiser to choose genre of copyrightable works he or she wants to display/perform advertisements in/alongside. In some embodiments, the genres selected may represent genre preferences expressed implicitly or explicitly by consumers, and the advertiser can select to display/perform advertisements to this psychographic regardless of the genres they are consuming at a given time. At dropdowns 1416 and 1418, an advertiser can choose target user gender(s) to which he or she wants to display advertisements. At textboxes 1420 and 1422, the NDMS 106 can ask an advertiser to choose targeted user age range to which he or she wants to display/perform advertisement. At dropdowns 1424, 1426 and 1428, an advertiser can choose a time period during which he or she wants to display/perform advertisements. The advertiser can enter these inputs via "sliders", text boxes, "auto-complete lists", "maps" and/or other UI elements. Upon the advertiser's input, the NDMS 106 can update data in the data repository 108.

TERMINOLOGY

A number of computing systems have been described throughout this disclosure. The descriptions of these systems are not intended to limit the teachings or applicability of this disclosure. For example, the NDMS 106 described herein can generally include any computing device(s). In addition, the user systems 102 described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. The data repositories shown can represent physical and/or logical data storage, including, for example, storage area network or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," or "one of X, Y, and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each can be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

In various embodiments of the present disclosure, there can be one or more naming formatting conventions. For example, the terms "artist" and "rightsholder" may be interchangeable. in some contexts. Similarly, the terms "copyrighted" and "copyrightable", and the terms "work(s)" and "content(s)" may be interchangeable in some contexts. Also, there can be one or more naming conventions for the tables and table items in FIG. 2A-2F. The tables, SQL stored procedures, and Pseudo-Codes in the present disclosures are only one of many examples of some embodiments.

What is claimed is:

1. A database processing system including a server and a database repository including one or more databases, the server configured to retrieve and store data items in the one or more databases, the database processing system comprising:

the database repository comprising:

a first database configured to store a plurality of copyrightable works, wherein for each of the respective plurality of copyrightable works, the first database stores nested copyrightable works data items including one or more rightsholders and shares associated with the rightsholders for the respective plurality of copyrightable works; and the server configured to:
receive a first HTTP request from a first computer over a network, the first HTTP request comprising a first instruction to store a digital object including a first derivative copyright content;
store identification data associated with the digital object in the database repository;
receive a second HTTP request from the first computer over the network, the second HTTP request comprising a first instruction to identify a first reused content in the first derivative copyright content;
query the data repository based on the first instruction to identify the first reused content from the plurality of copyrightable works;
retrieve first reused content data items associated with the first reused content based on the query of the database repository;
transmit at least some of the first reused content data items to the first computer over the network;
map the first reused content with the stored identification data associated with the digital object;
transmit, over the network, a message to an owner of the first reused content, the message comprising the identification data associated with the digital object;
identify a first reuse type associated with the digital object and corresponding to the first reused content;
determine a first right type that gets carried over based at least on the first reuse type;
dynamically retrieve a first list of rightsholders of the first reused content from the data repository based on the first right type, the first list of rightsholders having respective shares in the first reused content;
store the retrieved first list of rightsholders as nested data items in relation with the stored identification data associated with the digital object;
establish a session between the server and a second computer in response to receiving a third request for the digital object;
transmit a stream comprising the digital object and a secondary digital object from the server or a third party computing system over the established session;
store identification data associated with the secondary digital object in the data repository in relation with the stored identification data associated with the digital object; and
assign royalty distribution to the first list of rightsholders based at least on the nested data items stored in relation with the stored identification data associated with the digital object, the stored relation between the stored identification data associated with the secondary digital object and the stored identification data associated with the digital object, and the respective shares.

2. The system of claim 1, wherein the server is further configured to determine a respective weight associated with the first right type.

3. The system of claim 2, wherein the respective weight is further determined based on a type of art associated with the digital object.

4. The system of claim 2, wherein the first right type comprises at least one of: a musical composition, a sound recording, a video right, an episode right, a story right, and a movie right.

5. The system of claim 1, wherein the digital object comprises at least one of: a song, a music video, a television show, and a movie.

6. The system of claim 1, wherein the first reuse type comprises at least one of: a cover, a sample, a mashup, a remix, an audio sample, a short clip, a music video, a long clip, a remake, and a sequel.

7. The system of claim 1, wherein the server is further configured to automatically secure a license from the owner of the first reused content.

8. A database processing method executed on a server to retrieve and store data items in one or more databases of a data repository, the database processing method comprising:
storing a plurality of copyrightable works in a first database, wherein for each of the respective plurality of copyrightable works, storing nested copyrightable works data items including one or more rightsholders and shares associated with the rightsholders for the respective plurality of copyrightable works in the first database;
receiving a first HTTP request from a first computer over a network, the first HTTP request comprising a first instruction to store a digital object including a first derivative copyright content;
storing identification data associated with the digital object in the database repository;
receiving a second HTTP request from the first computer over the network, the second HTTP request comprising a first instruction to identify a first reused content in the first derivative copyright content;
querying the data repository based on the first instruction to identify the first reused content from the plurality of copyrightable works;
retrieving first reused content data items associated with the first reused content based on the query of the database repository;
transmitting at least some of the first reused content data items to the first computer over the network;
mapping the first reused content with the stored identification data associated with the digital object;
transmitting, over the network, a message to an owner of the first reused content, the message comprising the identification data associated with the digital object;
identifying a first reuse type associated with the digital object and corresponding to the first reused content;
determining a first right type that gets carried over based at least on the first reuse type;
dynamically retrieving a first list of rightsholders of the first reused content from the data repository based on the first right type, the first list of rightsholders having respective shares in the first reused content;
storing the retrieved first list of rightsholders as nested data items in relation with the stored identification data associated with the digital object;
establishing a session between the server and a second computer in response to receiving a third request associated with the digital object;
transmitting a stream comprising the digital object and a secondary digital object from the server or a third party computing system over the established session;
storing identification data associated with the secondary digital object in the data repository in relation with the stored identification data associated with the digital object; and
assigning royalty distribution to the first list of rightsholders based at least on the nested data items stored in relation with the stored identification data associated with the digital object, the stored relation between the stored identification data associated with the secondary digital object and the stored identification data associated with the digital object, and the respective shares.

9. The method of claim 8, further comprising determining a respective weight associated with the first right type.

10. The method of claim 9, wherein the respective weight is further determined based on a type of art associated with the digital object.

11. The method of claim 9, wherein the first right type comprises at least one of: a musical composition, a sound recording, a video right, an episode right, a story right, and a movie right.

12. The method of claim 8, wherein the digital object comprises at least one of: a song, a music video, a television show, and a movie.

13. The method of claim 8, wherein the first reuse type comprises at least one of: a cover, a sample, a mashup, a remix, an audio sample, a short clip, a music video, a long clip, a remake, and a sequel.

* * * * *